US011911637B2

(12) United States Patent
Brick et al.

(10) Patent No.: US 11,911,637 B2
(45) Date of Patent: Feb. 27, 2024

(54) MASK

(71) Applicant: Ford Global Technologies, LLC, Dearborn, MI (US)

(72) Inventors: William Charles Brick, Berkley, MI (US); Martin Delonis, Northville, MI (US); James Yu-Hsin Kuo, Farmington Hills, MI (US); Arnav Wagh, Detroit, MI (US); Michael Harmon, Westland, MI (US); Jason Powell, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 677 days.

(21) Appl. No.: 17/111,786

(22) Filed: Dec. 4, 2020

(65) Prior Publication Data

US 2022/0176169 A1 Jun. 9, 2022

(51) Int. Cl.

| | |
|---|---|
| ***A62B 18/02*** | (2006.01) |
| ***A62B 7/10*** | (2006.01) |
| ***A62B 18/10*** | (2006.01) |
| ***A62B 18/08*** | (2006.01) |
| ***A62B 9/02*** | (2006.01) |
| ***A62B 23/02*** | (2006.01) |

(52) U.S. Cl.

CPC .............. *A62B 18/025* (2013.01); *A62B 7/10* (2013.01); *A62B 9/02* (2013.01); *A62B 18/084* (2013.01); *A62B 18/10* (2013.01); *A62B 23/02* (2013.01)

(58) Field of Classification Search

CPC ....... A62B 18/025; A62B 18/02; A62B 18/08; A62B 18/082; A62B 18/10; A62B 18/084; A62B 7/10; A62B 9/02; A62B 23/02; A62B 23/025; A41D 13/11; A41D 13/1107; A41D 13/1138; A41D 13/1146; A41D 13/1192; A41D 13/1115

See application file for complete search history.

(56) References Cited

U.S. PATENT DOCUMENTS

| | | | |
|---|---|---|---|
| 3,500,825 | A | 3/1970 | Andersson et al. |
| 4,323,063 | A | 4/1982 | Fisichella |
| 5,165,395 | A | 11/1992 | Ricci |
| 6,173,712 | B1 | 1/2001 | Brunson |
| 7,802,572 | B2 | 9/2010 | Hahne |
| 9,827,723 | B2 | 11/2017 | Klockseth |

(Continued)

FOREIGN PATENT DOCUMENTS

| | | | |
|---|---|---|---|
| AU | 2020101320 | A4 | 8/2020 |
| CN | 104510031 | A | 4/2015 |
| CN | 106388081 | A | 2/2017 |
| CN | 110507020 | A | 11/2019 |

(Continued)

OTHER PUBLICATIONS

English Machine Translation of KR-102117442-B1 provided by Espacenet (Year: 2020).*

(Continued)

*Primary Examiner* — Joseph D. Boecker
*Assistant Examiner* — Brian T Khong
(74) *Attorney, Agent, or Firm* — David B. Kelley; Carlson, Gaskey & Olds, P.C.

(57) ABSTRACT

This disclosure relates to a mask, and in particular a mask configured as a respirator. The disclosed mask is relatively low cost and relatively easy to manufacture. Further, the disclosed mask is reusable and customizable.

19 Claims, 23 Drawing Sheets

(56) References Cited

U.S. PATENT DOCUMENTS

| | | | | |
|---|---|---|---|---|
| 10,945,469 | B1 * | 3/2021 | Rosenberg | A62B 18/08 |
| 2006/0230485 | A1 * | 10/2006 | Lee | A41D 13/1138 2/15 |
| 2007/0277829 | A1 | 12/2007 | Casewell | |
| 2008/0053450 | A1 * | 3/2008 | Van Kerkwyk | A61M 16/06 128/205.25 |
| 2008/0092909 | A1 | 4/2008 | Hahne | |
| 2009/0000624 | A1 * | 1/2009 | Lee | A62B 18/084 128/207.11 |
| 2009/0133700 | A1 * | 5/2009 | Martin | A62B 23/025 128/207.12 |
| 2010/0239625 | A1 | 9/2010 | Puckett et al. | |
| 2015/0352309 | A1 | 12/2015 | Daly | |
| 2016/0029716 | A1 * | 2/2016 | Duncan | A41D 13/11 128/863 |
| 2016/0243383 | A1 | 8/2016 | Yazdi et al. | |
| 2018/0008848 | A1 * | 1/2018 | Moulton | A62B 18/025 |
| 2018/0264161 | A1 | 9/2018 | Welch | |
| 2020/0121005 | A1 * | 4/2020 | Belousov | A41D 13/1107 |
| 2023/0074044 | A1 * | 3/2023 | Grayson | A62B 23/025 |

FOREIGN PATENT DOCUMENTS

| | | | |
|---|---|---|---|
| IN | 202041019945 | | 5/2020 |
| KR | 102117442 | B1 * | 6/2020 |
| WO | 2021155421 | A1 | 8/2021 |

OTHER PUBLICATIONS

NIH Vacuum Formed Stopgap Face Mask, NIH 3D Print Exchange, remix of model 3DPX-013977 by akitt@ewi.org. Model ID: 3DPX-013977. Downloaded from https://3dprint.nih.gov/discover/3dpx-031977 on Aug. 11, 2020.

4pcs-visible-face-mask-with-clear-mouth-cover-transparent-lip-reading-respirator-mask. Wish. (n.d.). Retrieved Jun. 6, 2022, from https://www.wish.com/es/product/24pcs-visible-face-mask-with-clear-mouth-cover-transparent-lip-reading-respirator-mask-with-filters-anti-spray-anti-fogging-mask-show-your-smile-reusable-deaf-mute-people-mask-5fd3ac98bb824633599abc65?hide_login_modal=true&share=web.

ClearMask™ Transparent Surgical Mask. ClearMask. (n.d.). Retrieved Jun. 6, 2022, from https://buy.theclearmask.com/collections/medical.

* cited by examiner

MASK

TECHNICAL FIELD

This disclosure relates to a mask, and in particular a mask configured as a respirator.

BACKGROUND

Respirators are a type of mask worn over the mouth and nose to protect the wearer's respiratory system by filtering out substances such as dust, fumes, bacteria, etc., from inhaled air.

SUMMARY

A mask according to an exemplary aspect of this disclosure includes, among other things, an opening in a first side wall, an opening in a second side wall, a first filter fully covering the opening in the first side wall, and a second filter fully covering the opening in the second side wall.

In a further non-limiting embodiment of the foregoing mask, the mask includes an outer shell including a first set of openings and a second set of openings, and an inner shell including a first set of openings and a second set of openings. Further, the inner shell is nested within the outer shell such that the first and second sets of openings of the inner shell substantially align with corresponding first and second sets of openings of the outer shell. Further, the first filter is arranged between the inner shell and the outer shell such that the first filter fully overlaps the first sets of openings, and the second filter is arranged between the inner shell and the outer shell such that the second filter fully overlaps the second sets of openings.

In a further non-limiting embodiment of any of the foregoing masks, the inner and outer shells each comprise a forward panel and a perimeter wall projecting from an edge of the forward panel to a free end.

In a further non-limiting embodiment of any of the foregoing masks, the perimeter walls of the inner and outer shells are tapered toward the forward panels.

In a further non-limiting embodiment of any of the foregoing masks, the first and second sets of openings of the outer shell are formed in the perimeter wall of the outer shell, and the first and second sets of openings of the inner shell are formed in the perimeter wall of the inner shell.

In a further non-limiting embodiment of any of the foregoing masks, the masks include a seal covering the free ends of the perimeter walls of the inner and outer shells.

In a further non-limiting embodiment of any of the foregoing masks, the seal includes a slot receiving the free ends of the perimeter walls of the inner and outer shells.

In a further non-limiting embodiment of any of the foregoing masks, the slot of the seal includes a plurality of fingers inclined away from an opening of the slot.

In a further non-limiting embodiment of any of the foregoing masks, the seal includes a constant cross-section along an entirety of the seal.

In a further non-limiting embodiment of any of the foregoing masks, the forward panels are transparent.

In a further non-limiting embodiment of any of the foregoing masks, the first and second filters are arranged so as to not obscure a view through the forward panels.

In a further non-limiting embodiment of any of the foregoing masks, the mask includes a deflector adjacent a top of the forward panel of the inner shell. The deflector is configured to direct air exhaled out a nose of a wearer away from the forward panel of the inner shell.

In a further non-limiting embodiment of any of the foregoing masks, the mask includes a plurality of strap attachments projecting outward from the perimeter wall of the outer shell and configured to attach to a strap. At least some of the plurality of strap attachments are arranged closer to the forward panels than the free ends of the perimeter walls of the inner and outer shells.

In a further non-limiting embodiment of any of the foregoing masks, each perimeter wall includes a first side wall, a second side wall opposite the first side wall, a top wall spanning between the first and second side walls, and a bottom wall opposite the top wall and spanning between the first and second side walls, and the plurality of strap attachments includes four strap attachments arranged adjacent forward corners of the mask.

In a further non-limiting embodiment of any of the foregoing masks, the plurality of strap attachments include discs configured to interface with loops of a strap.

In a further non-limiting embodiment of any of the foregoing masks, the mask includes a first valve assembly attached to an interior of the inner shell and arranged relative to the first sets of openings to permit inflow of air through the first sets of openings and restrict outflow of air from the first sets of openings. Further, the mask includes a second valve assembly attached to an exterior of the outer shell and arranged relative to the second sets of openings to restrict inflow of air through the second sets of openings and permit outflow of air from the second sets of openings. The first and second valve assemblies each include a plurality of openings and deflectable vanes moveable to cover and uncover the openings.

In a further non-limiting embodiment of any of the foregoing masks, a dimple of the outer shell holds the inner shell in place.

In a further non-limiting embodiment of any of the foregoing masks, the first and second filters are held in place by a frame.

A mask according to another exemplary aspect of the present disclosure includes, among other things, an outer shell including a transparent forward panel and a perimeter wall projecting from an edge of the forward panel to a free end. First and second openings are formed in the perimeter wall of the outer shell. The mask further includes an inner shell including a transparent forward panel and a perimeter wall projecting from an edge of the forward panel to a free end. First and second openings are formed in the perimeter wall of the inner shell. Further, the inner shell is nested within the outer shell such that the first and second openings of the inner shell substantially align with a respective one of the first and second openings of the outer shell. The mask also includes a first filter fully overlapping the first openings and a second filter fully overlapping the second opening. A seal is also included. The seal covers the free ends of the perimeter walls of the inner and outer shells, and the seal includes a slot receiving the free ends of the perimeter walls of the inner and outer shells.

A mask according to another exemplary aspect of the present disclosure includes, among other things, an outer shell including a first set of openings, a second set of openings, a forward panel, and a perimeter wall projecting from an edge of the forward panel to a free end. The mask further includes an inner shell including a first set of openings, a second set of openings, a forward panel, and a perimeter wall projecting from an edge of the forward panel to a free end. The inner shell is nested within the outer shell such that the first and second sets of openings of the inner shell substantially align with corresponding first and second sets of openings of the outer shell. Further, the mask includes a first filter arranged between the inner shell and the outer shell such that the first filter fully overlaps the first sets of openings, a second filter arranged between the inner shell and the outer shell such that the second filter fully overlaps the second sets of openings, and a seal covering the free ends of the perimeter walls of the inner and outer shells. The seal includes a slot receiving the free ends of the perimeter walls of the inner and outer shells. The slot includes a plurality of fingers inclined away from an opening of the slot, and the seal includes a constant cross-section along an entirety of the seal. The mask further includes a plurality of strap attachments projecting outward from the perimeter wall of the outer shell and configured to attach to a strap, and at least some of the plurality of strap attachments are arranged closer to the forward panels than the free ends. Further, the perimeter walls of the inner and outer shells are tapered toward the forward panels. Additionally, the first and second sets of openings of the outer shell are formed in the perimeter wall of the outer shell, the first and second sets of openings of the inner shell are formed in the perimeter wall of the inner shell, the forward panels are transparent, and the first and second filters are arranged so as to not obscure a view through the forward panels.

DETAILED DESCRIPTION

This disclosure relates to a mask, and in particular a mask configured as a respirator. Among other benefits, which will be appreciated from the below description, the disclosed mask is relatively low cost and relatively easy to manufacture. Further, the disclosed mask is reusable and customizable.

Figure 1:
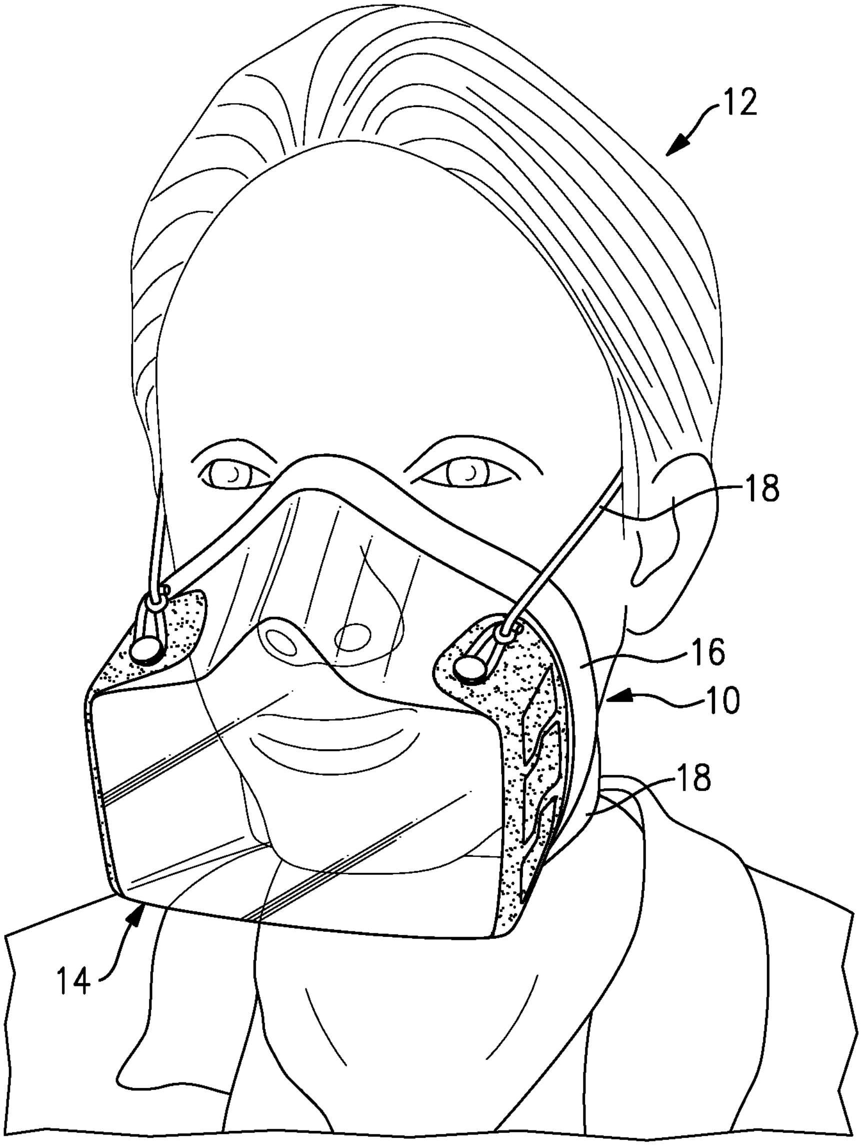
FIG. 1 is a front perspective view of an example mask worn by a wearer.

FIG. 1 illustrates a mask 10 being worn by a wearer 12. The mask 10 includes a number of components, and thus the mask 10 may be referred to as a mask assembly, mask system, a system, or an assembly. The mask 10 is configured as a respirator, and, when worn by the wearer 12, is configured to seal against a face of the wearer 12 so as to cover the mouth and nose of the wearer 12. In doing so, the mask 10 protects the respiratory system of the wearer 12 by filtering out substances such as dust, fumes, bacteria, etc., from inhaled air. The mask 10 also filters air exhaled by the wearer 12 to protect others in close proximity to the wearer 12 from any substances that may be present in the air exhaled by the user.

Figure 2:
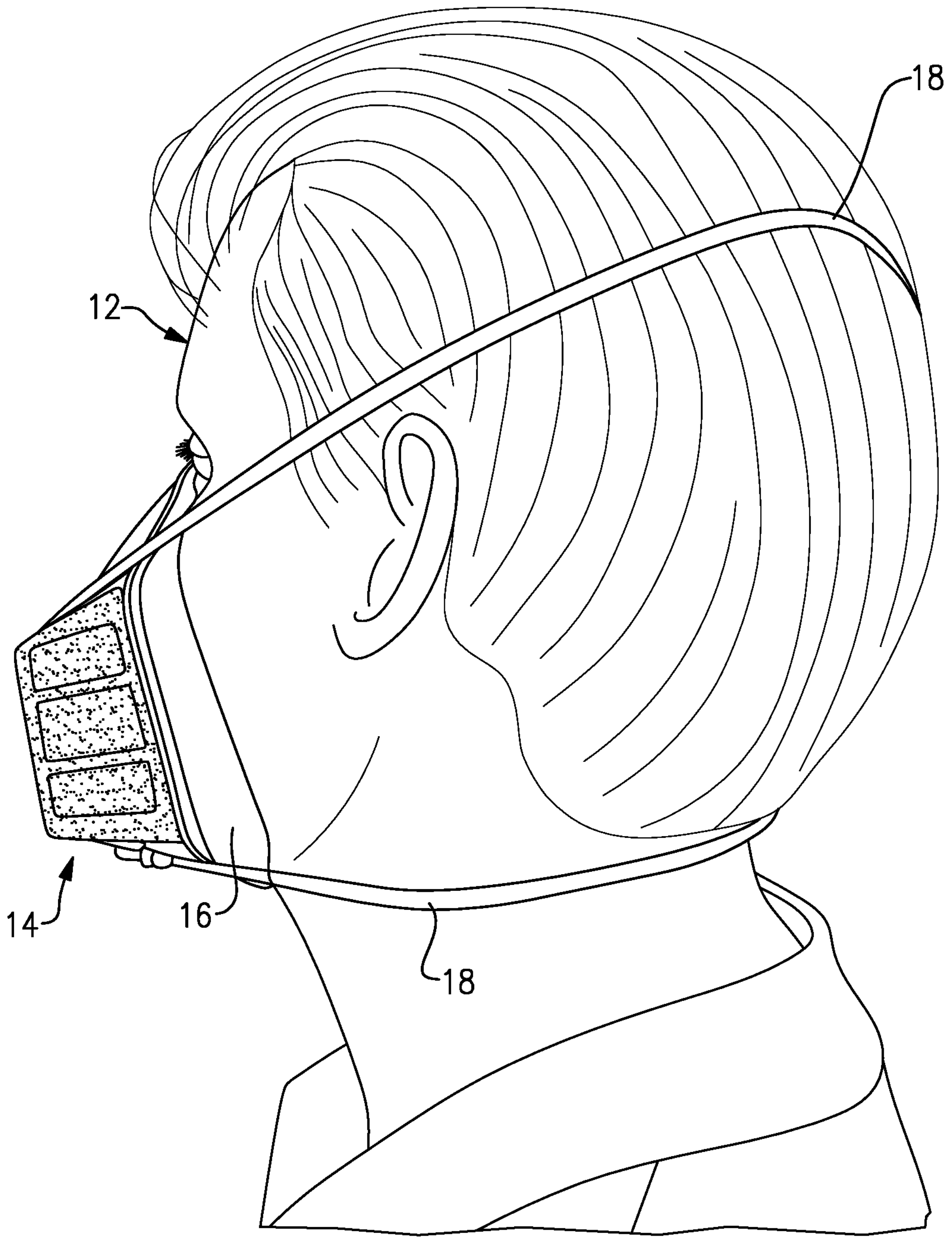
FIG. 2 is a rear perspective view of the example mask worn by the wearer.

The mask 10 includes a facepiece portion 14 configured to surround a nose and mouth of the wearer 12. Adjacent the face of the wearer 12, the facepiece portion 14 is attached to a seal 16 which is configured to directly contact and seal against the face of the wearer 12. With reference to FIGS. 1 and 2, straps 18 attached to the facepiece portion 14 pass around a head and/or neck of the wearer 12 and hold the seal 16 against the face of the wearer 12.

Figure 3:
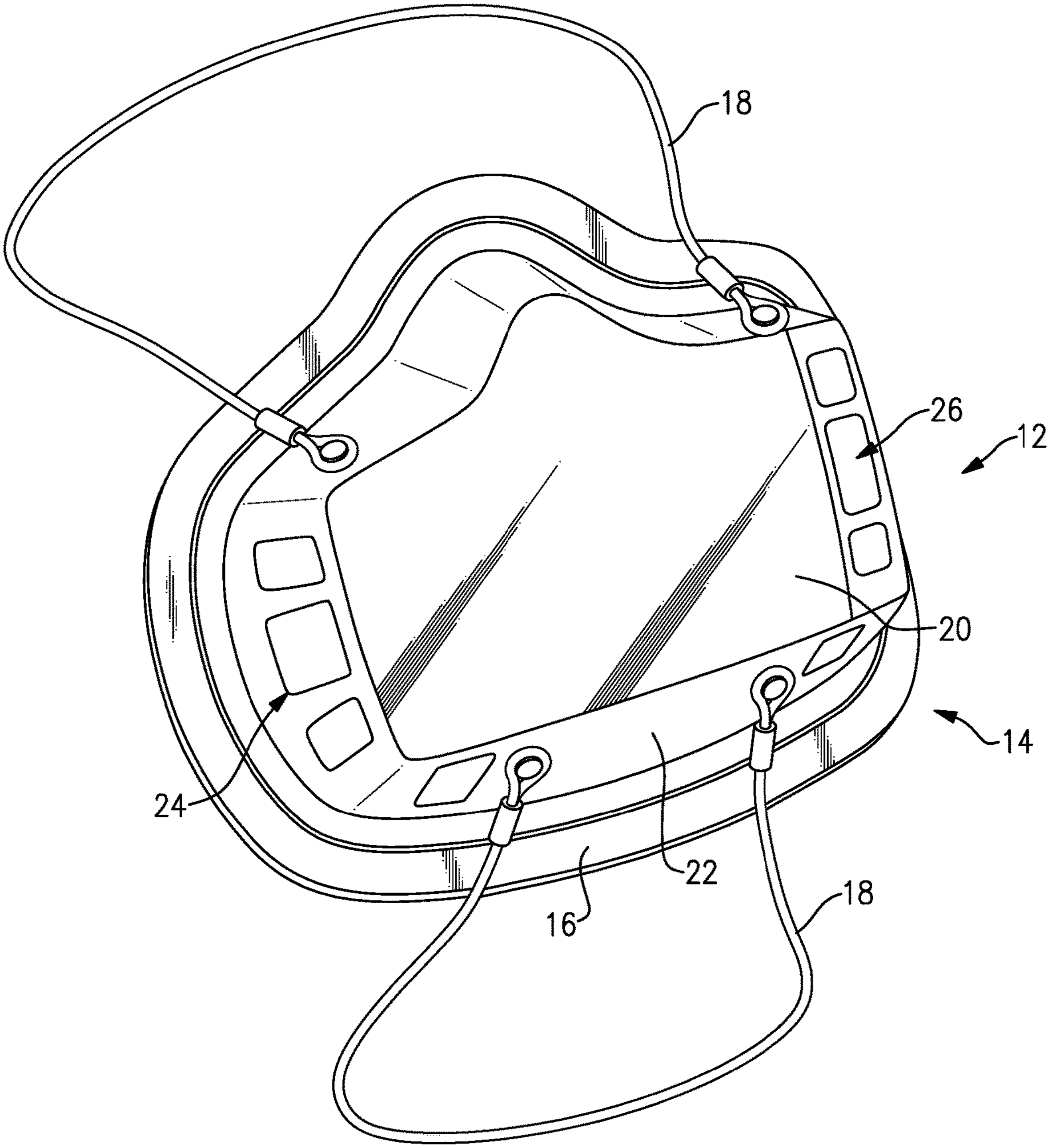
FIG. 3 is a front perspective view of the example mask.

With reference to FIG. 3, the facepiece portion 14 includes a front viewport 20, which is essentially a transparent window in a forward-facing portion of the facepiece portion 14 through which a view of the mouth and nose of the wearer 12 is unobstructed. The mask 10 is configured such that the front viewport 20 is spaced-apart from the tip of the nose of the wearer 12 and the mouth of the wearer 12. In this way, comfort of the mask 10 is increased. Further, as the front viewport 20 is transparent, more of the face of the wearer 12 is visible relative to traditional opaque masks, which improves non-verbal communication. The facepiece portion 14 is at least partially formed of plastic in this disclosure. The front viewport 20 provides a relatively large, blank surface, that can be customized by adding stickers or decals, depending on preferences of the wearer 12.

The facepiece portion 14 further includes a perimeter wall 22 projecting rearward of the front viewport 20 toward the seal 16. The perimeter wall 22 extends about the entire perimeter of the mask 10. Further, first and second sets of openings 24, 26 are arranged in the perimeter wall 22 and are configured to permit air to flow in and out of the mask 10, to and from the mouth and nose of the wearer 12. The first and second sets of openings 24, 26 are filtered so as to protect the wearer 12 from the nearby environmental conditions, and to protect those near the wearer 12 from the air expelled by the wearer 12. By providing the first and second sets of openings 24, 26 in the perimeter wall 22, as opposed to the front viewport 20, the front viewport 20 remains unobscured by any filters, and the filters are taken out of the direct path of exhalation of the wearer 12, prolonging the useful life of the filters.

In an example of this disclosure, the facepiece portion 14 is constructed of two nested shells. In particular, with reference to FIG. 4, an outer shell 28 of the facepiece portion 14 and an inner shell 30 of the facepiece portion 14 are shown from a left side view. The inner shell 30 is sized and shaped substantially similar to the outer shell 28 such that the inner shell 30 is nestable within the outer shell 28, as shown in FIG. 5. In another example, the inner shell 30 may project slightly outward of the outer shell 28 when nested, in the right-hand direction relative to FIG. 4, for attachment to the seal 16.

Figure 4:
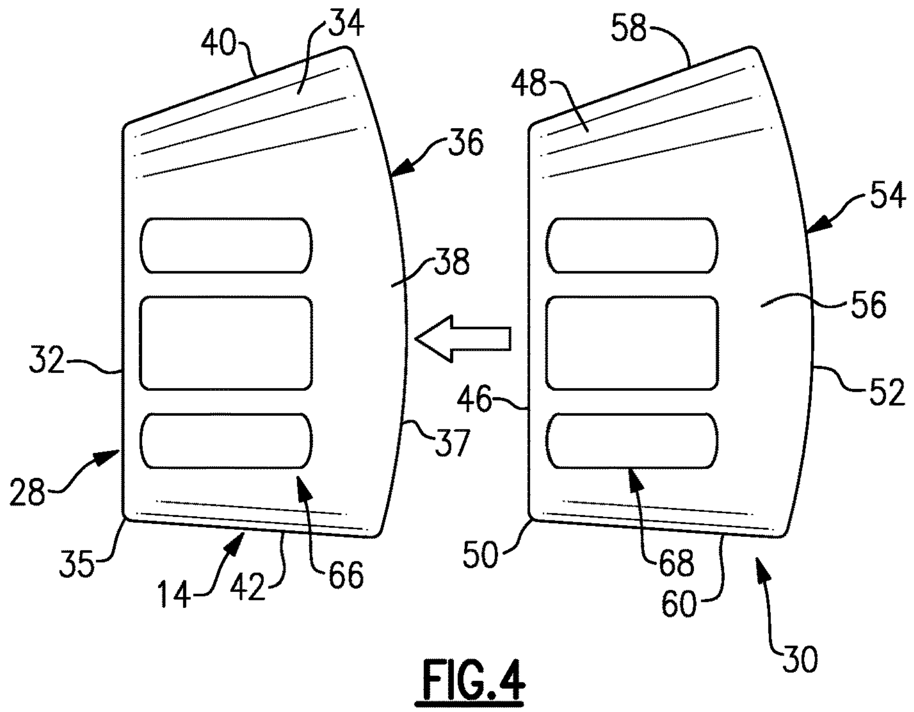
FIG. 4 is a side, exploded view of inner and outer shells of the example mask.
Figure 5:
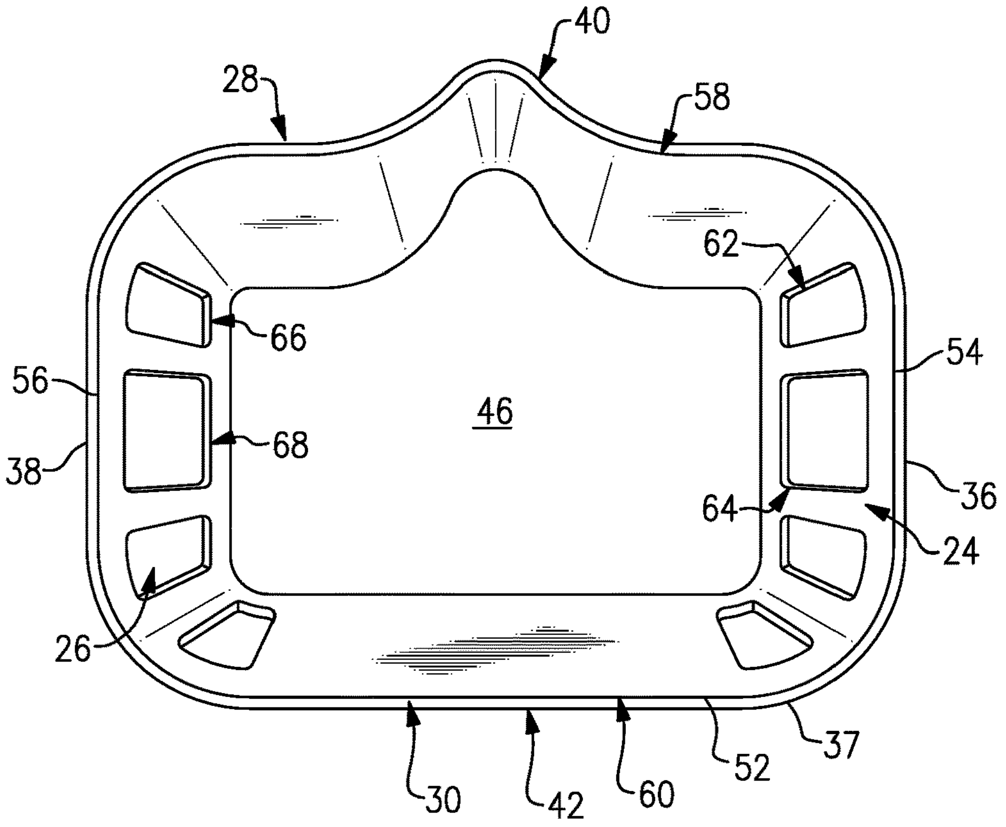
FIG. 5 is an end view of the inner and outer shells of the mask and, in particular, illustrates the inner shell nested within the outer shell.

With joint reference to FIGS. 4 and 5, the outer shell 28 includes a forward panel 32 and a perimeter wall 34 extending rearward (i.e., in the right-hand direction) from a perimeter edge 35 of the forward panel 32 to a free end 37. The perimeter wall 34 includes a first side wall 36, a second side wall 38 opposite the first side wall 36, a top wall 40 spanning between the first and second side walls 36, 38, a bottom wall 42 opposite the top wall 40 and spanning between the first and second side walls 36, 38. The inner shell 30 likewise includes a forward panel 46 and a perimeter wall 48 extending rearward from a perimeter edge 50 of the forward panel 46 to a free end 52. The perimeter wall 48 includes a first side wall 54, a second side wall 56 opposite the first side wall 54, a top wall 58 spanning between the first and second side walls 54, 56, a bottom wall 60 opposite the top wall 58 and spanning between the first and second side walls 54, 56.

The forward panels 32, 46 are substantially square when viewed from head-on with the exception of the top edges thereof, which are contoured to accommodate a nose of the wearer. The forward panels 32, 46 may resemble shapes other than squares when viewed from head on. The perimeter walls 34, 48 follow the general shape of the forward panels 32, 46. In order to facilitate nesting of the outer and inner shells 28, 30, the perimeter panels 34, 48 are tapered leading from the free ends 37, 52 to the forward panels 32, 46, meaning an inner dimension of the outer and inner shells 28, 30 gradually reduces toward the forward panels 32, 46. The perimeter walls 34, 48 are dimensioned so that the forward panel 46 does not directly contact a tip of a nose of the wearer 12 or the mouth of the wearer 12.

The outer and inner shells 28, 30 are formed of a plastic material, and in particular a transparent plastic material in this example. The plastic material may be rigid or deformable. The outer and inner shells 28, 30 are vacuum formed in one example. In particular, the outer and inner shells 28, 30 may be vacuum formed over a common die such that the inner and outer shells 28, 30 are substantially identical. Other manufacturing techniques come within the scope of this disclosure.

When the inner shell 30 is nested within the outer shell 28, the forward panels 32, 46 are aligned to provide the front viewport 20. With reference to FIG. 5, the first set of openings 24 are provided by aligning a first set of openings 62 formed in the first side wall 36 of the outer shell 28 with a first set of openings 64 formed in the first side wall 54 of the inner shell 30, as generally shown in FIG. 5. Likewise, second set of openings 26 are provided by aligning a first set of openings 66 formed in the second side wall 38 of the outer shell 28 with a second set of openings 68 formed in the second side wall 56 of the inner shell 30. The perimeter walls 34, 48 may alternatively or in addition include openings in the top and/or bottom walls, and in particular there are two openings formed in the bottom walls 42, 60 in the embodiment of FIGS. 3-5.

Figure 6:
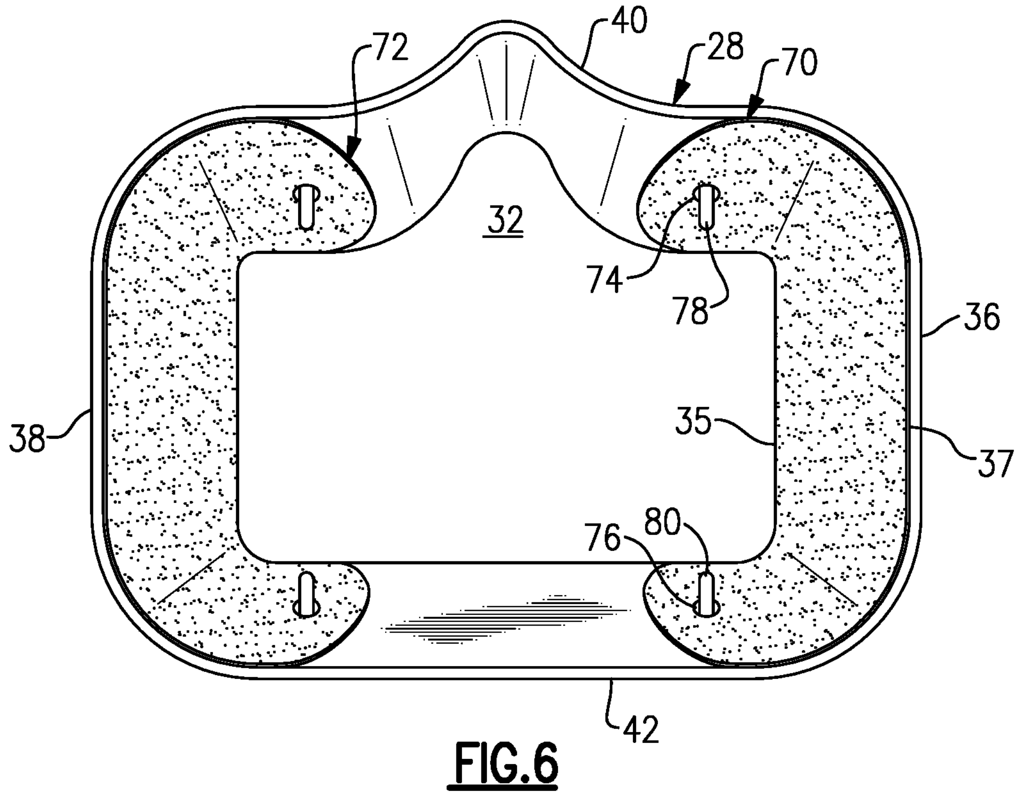
FIG. 6 is an end view of the outer shell including filters arranged relative to the outer shell.

Before nesting the inner shell 30 within the outer shell 28, filters 70, 72 are arranged relative to either the outer shell 28 or inner shell 30 such that the filters 70, 72 will fully overlap the first and second sets of openings 24, 26 when the outer and inner shells 28, 30 are nested. In the embodiment of FIG. 6, filters 70, 72 are positioned relative to an inner surface of the outer shell 28. The filters 70, 72 are provided by single or multiple layers of material configured to remove impurities or solid particles from airflow that passes through the filters 70, 72. The particular type of material for the filters 70, 72 can be selected depending on a particular application. The filters 70, 72 are replaceable.

With reference to the filter 70, the filter 70 includes a length such that the filter 70 extends from the bottom wall 42, along the entirety of the first side wall 36, and to the top wall 40. The filter 70 includes a width extending from substantially the perimeter edge 35 to the free end 37. In this way, the filter 70 is sized and shaped to fully overlap the first set of openings 24. In particular, air cannot flow in or out of the first set of openings 24 without passing through the filter 70.

The filter 70 includes first and second openings 74, 76 adjacent opposite ends thereof. Projections 78, 80 projecting inward from the top wall 40 and the bottom wall 42 pass through the openings 74, 76, respectively, to hold the filter 70 in place. The second filter 72 is arranged substantially similar to the first filter 70, and in particular the second filter 72 is arranged so as to fully overlap the second set of openings 26. Further, the outer shell 28 includes projections projecting through openings in the second filter 72 to hold the second filter 72 in place.

Figure 7:
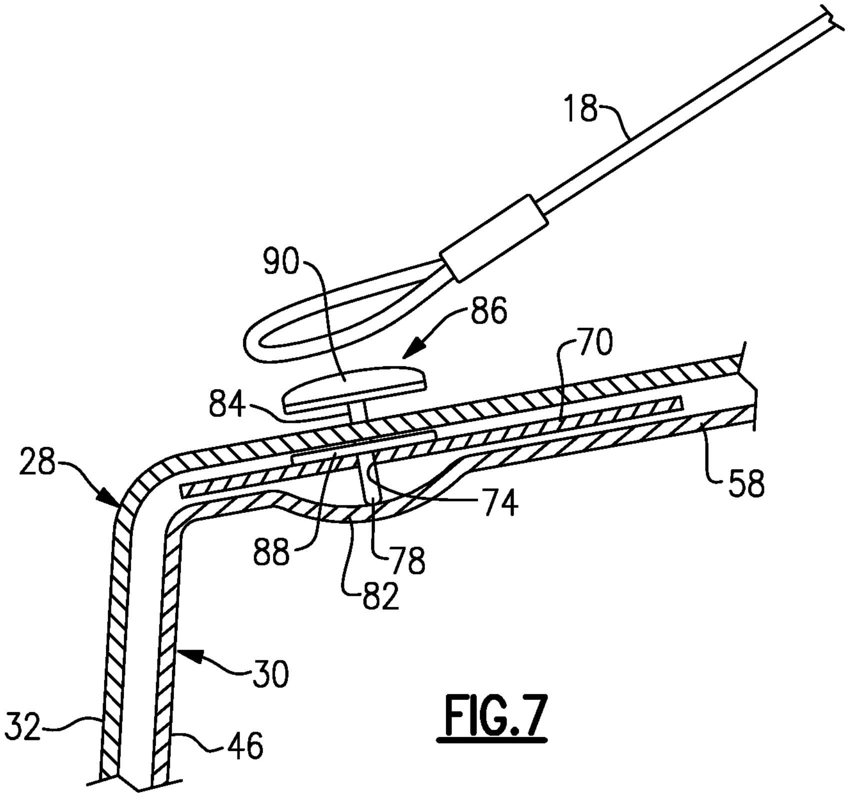
FIG. 7 is a sectional view illustrating an example arrangement of the filter, the inner shell, the outer shell, and a strap attachment.

FIG. 7 is a partial cross-sectional view illustrating the arrangement of the filter 70 relative to the outer and inner shells 28, 30, with the inner shell 30 nested within the outer shell 28. As shown in FIG. 7, the filter 70 is arranged between the outer and inner shells 28, 30. In order to accommodate the projection 78, the inner shell 30 may include a dimple 82 in the top wall 58. While shown as a curved surface 82, the dimple 82 could resemble a rectangular shape in cross section. Further, the projection 78 may be provided by a post 84 of a strap attachment 86. The strap attachment 86, in this example, includes a first disc 88 between the outer and inner shells 28, 30 and a second disc 90 spaced-apart from and outward of the outer shell 28. The post 84 may include one or more barbs or protrusions for holding the first disc 88 in place. A loop of the strap 18 is configured to fit over the second disc 90. In this regard, the second disc 90 acts as a button. The second disc 90 holds the strap 18 in place. It should be understood that similar strap attachments 86 are provided relative to the remaining openings in the filters 70, 72, thereby providing the mask 10 with a total of four strap attachments, each arranged adjacent a corner of the mask 10, as generally seen in FIG. 3, for example. At least some of the strap attachments are closer to the front viewport 20 than the free ends 37, 52 to provide increased stability and an effective seal against the face of the wearer 12.

Figure 8:
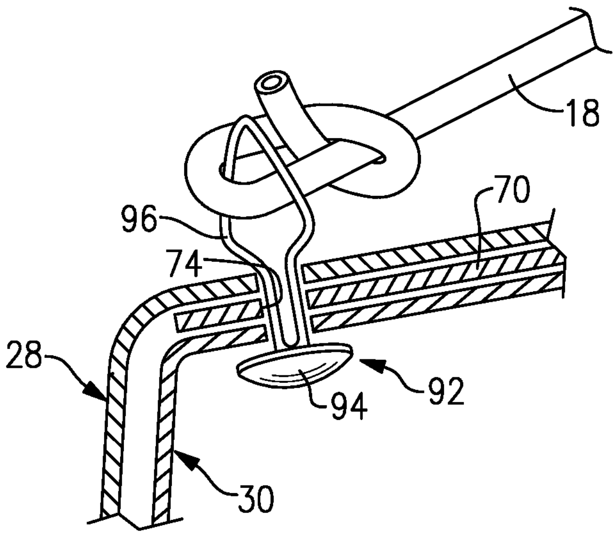
FIG. 8 is a sectional view illustrating another example arrangement of the filter, the inner shell, the outer shell, and a strap attachment.
Figure 9:
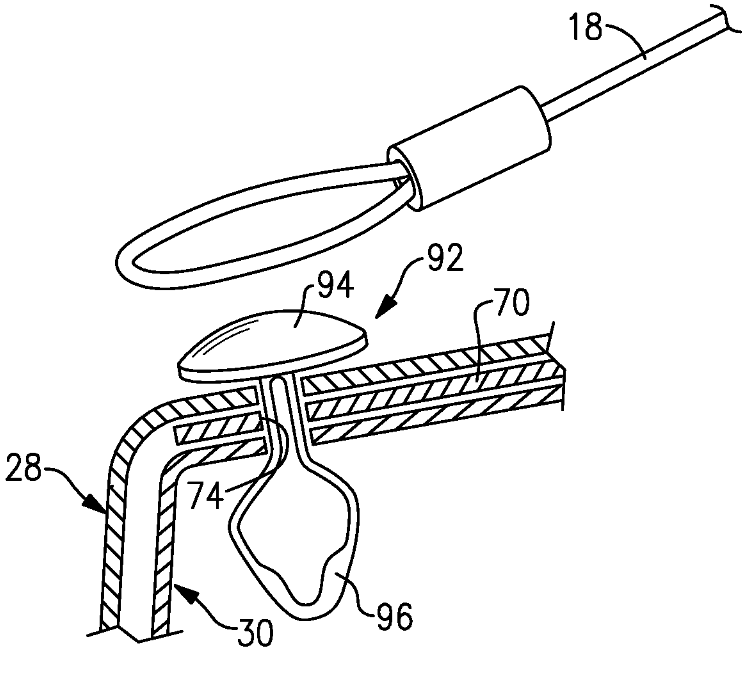
FIG. 9 is a sectional view illustrating still another example arrangement of the filter, the inner shell, the outer shell, and a strap attachment.

FIGS. 8 and 9 illustrate alternative strap attachment configurations, including a device 92, such as a rivet made of plastic, having a head 94, which is a disc shape and is substantially configured as a button, at one end and a deflectable loop 96 opposite the head 94. In FIG. 8, the head 94 is arranged inside the mask 10, and the deflectable loop 96 is pinched and passed through openings in the inner shell 30, filter 70, and outer shell 28 where the deflectable loop 96 returns to a relaxed state, in which the deflectable loop 96 exhibits wider configuration, thereby holding the device 92 in place, and such that a strap 18 can be tied to the deflectable loop 96. In FIG. 9, the device 92 is inserted in an opposite direction, such that the head 94 is outward of the mask 10, and such that a loop of the strap 18 may be provided over the head 94. While FIGS. 7-9 illustrate exemplary strap attachments, this disclosure extends to other strap attachment configurations, including those that use clasps, such as snap fasteners, configured to interface with the strap 18, as examples.

Figure 10:
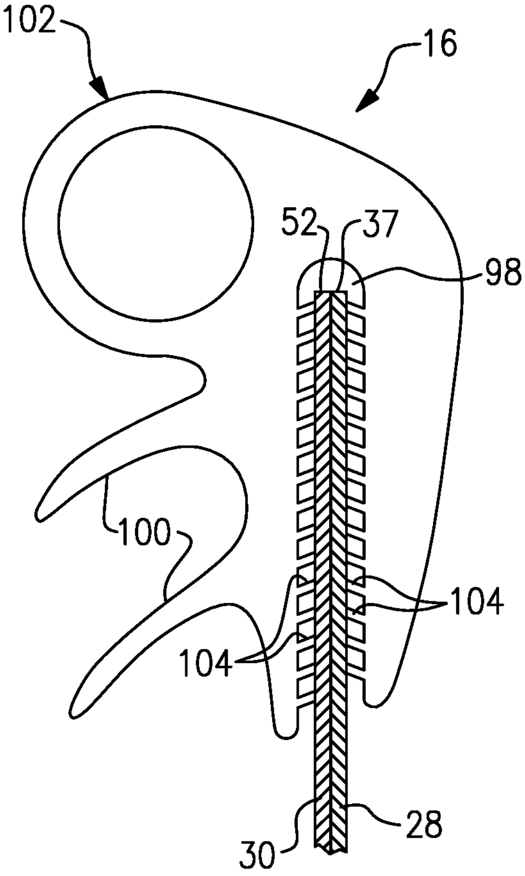
FIG. 10 is a sectional view illustrating an example arrangement between a seal and the inner and outer shells.
Figure 11:
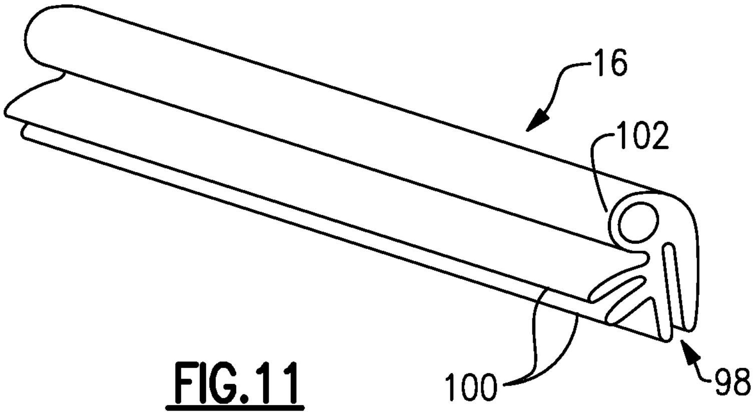
FIG. 11 is a perspective view illustrating the seal.

FIG. 10 illustrates, in cross-section, additional detail of the seal 16. In this example, the seal 16 includes a slot 98 configured to interface with the outer and/or inner shell 28, 30 and a plurality of face-sealing features, such as plurality of flaps 100 and a hollow bulb 102 configured to seal relative to a face of the wearer 12. As shown in FIG. 11, the seal 16 exhibits a constant cross-section along its entire length. In this regard, the seal 16 may be formed by an extrusion process. After extruding the seal 16, the seal 16 may be cut to length, fit relative to the outer and/or inner shells 28, 30, and ends of the seal 16 may be adhered together using adhesive tape or some other connection technique.

In FIG. 10, free ends 37, 52 of the outer and inner shells 28, 30 are received in the slot 98. The slot 98 includes a plurality of projections, or fingers 104 projecting from both sides of the slot 98 and inclined away from the opening of the slot 98 (i.e., inclined away from the bottom of FIG. 10) to resist movement of the outer and inner shell 28, 30 out of the slot 98. The fingers 104 on opposite sides of the slot 98 could align with one another along the length of the slot 98, or alternatively could be provided in an alternating arrangement such that the fingers 104 on one side of the slot 98 are staggered relative to the fingers 104 on the opposite side along the length of the slot 98. The alternating arrangement may facilitate manufacture. As shown in FIG. 10, with both the outer and inner shells 28, 30 in the slot 98, the seal 16 covers the free ends 37, 52 and spans the gap between the outer and inner shells 28, 30, which provides more effective filtration by ensuring air does not enter or escape the mask 10 via the gap between the outer and inner shells 28, 30.

Figure 12:
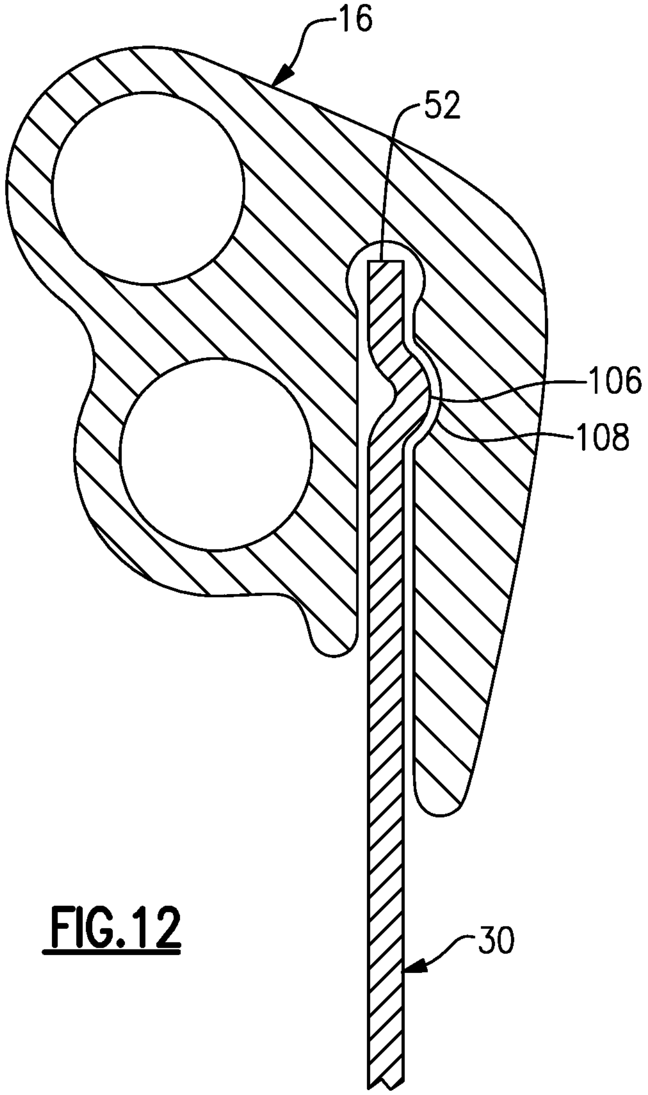
FIG. 12 is a sectional view illustrating another example arrangement between the seal and the inner shell.

In another example, as in FIG. 12, only the inner shell 30 is arranged in the slot 98, and a dimple 106 adjacent a free end 52 of the inner shell 30 is received in a corresponding recess 108 in the slot 98 to hold the inner shell 30 in place. The outer shell 28 could include a similar dimple arrangement and also be placed in the slot 98 in addition to or as an alternative to the inner shell 30.

Figure 13:
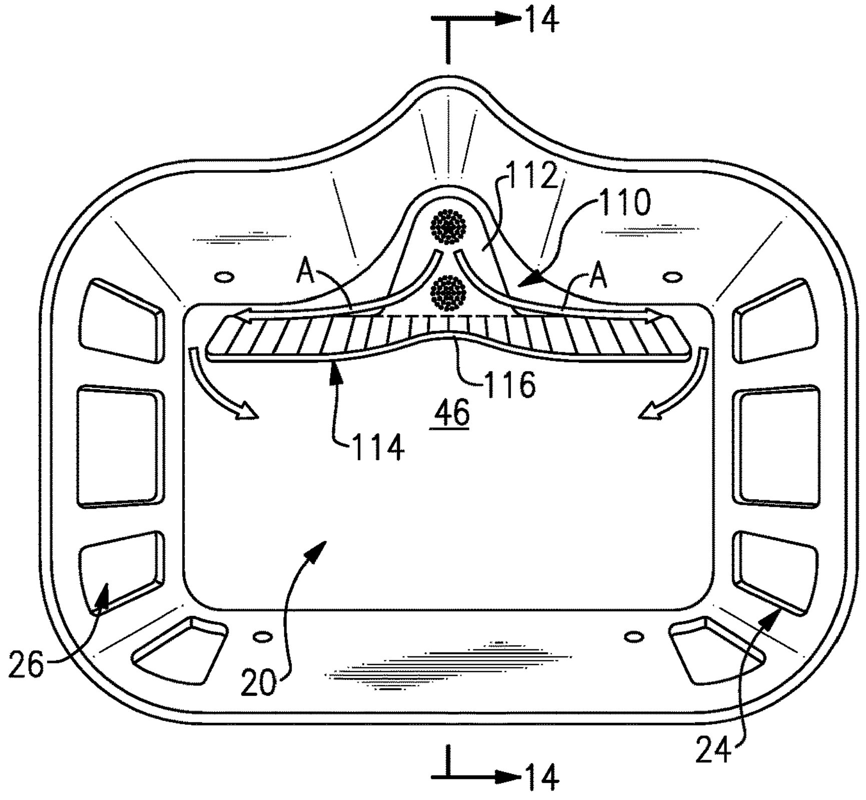
FIG. 13 is an end view of the inner and outer shells of the mask similar to FIG. 5, and illustrates a deflector.
Figure 14:
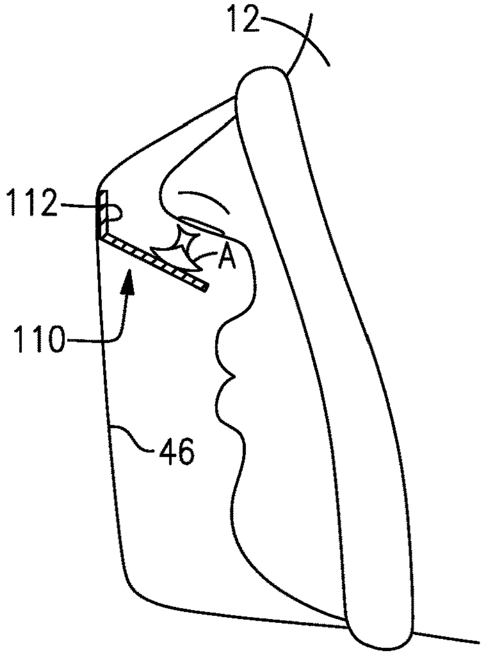
FIG. 14 is a side view of the mask and illustrates the deflector.

FIGS. 13 and 14 illustrate a deflector 110 configured to deflect air A exhaled from the nose of the wearer 12 away from the front viewport 20 and ultimately to the first and second sets of openings 24, 26 at the sides of the mask 10. The deflector 110 includes an attachment tab 112 attached adjacent a top of an inner surface of the forward panel 46 using adhesive or ultrasonic welding, as examples, and a body 114 projecting inward of the inner surface of the forward panel 46. The body 114 includes a raised portion, or bulge 116, at a center portion thereof to encourage air A to flow to the sides of the mask 10. The body 114 has a length extending from substantially the first side wall 54 to the second side wall 56 of the inner shell 30. The body 114 may be inclined relative to the forward panel 46 at a non-90° angle, as seen in FIG. 14. The deflector 110 prevents the front viewport 20 from fogging, among other potential benefits.

Figure 15:
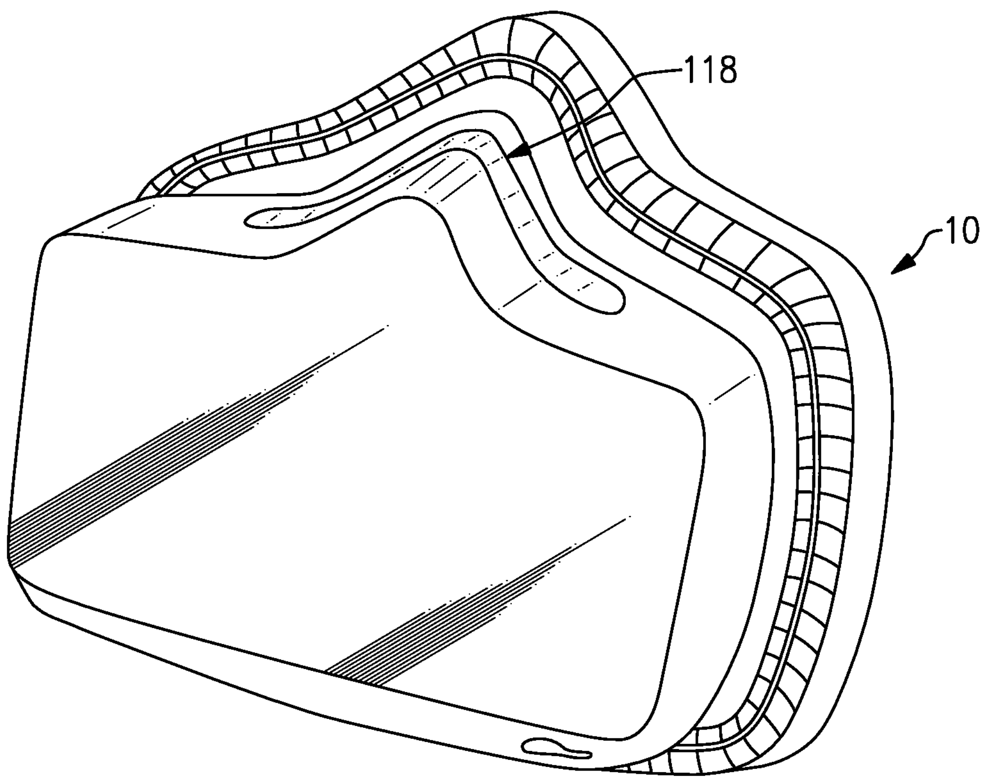
FIG. 15 is a front perspective view of the mask including a nose bridge.

As mentioned above, the outer and inner shells 28, 30 may be formed of plastic, which may be relatively rigid or flexible. In the examples where the outer and inner shells 28, 30 are formed of a relatively flexible plastic, a deformable metal nose bridge 118, shown in FIG. 15, may be arranged adjacent a top of either the outer or inner shell 28, 30 to permit the wearer to customize the fit of the mask 10 relative to their nose.

Figure 16:
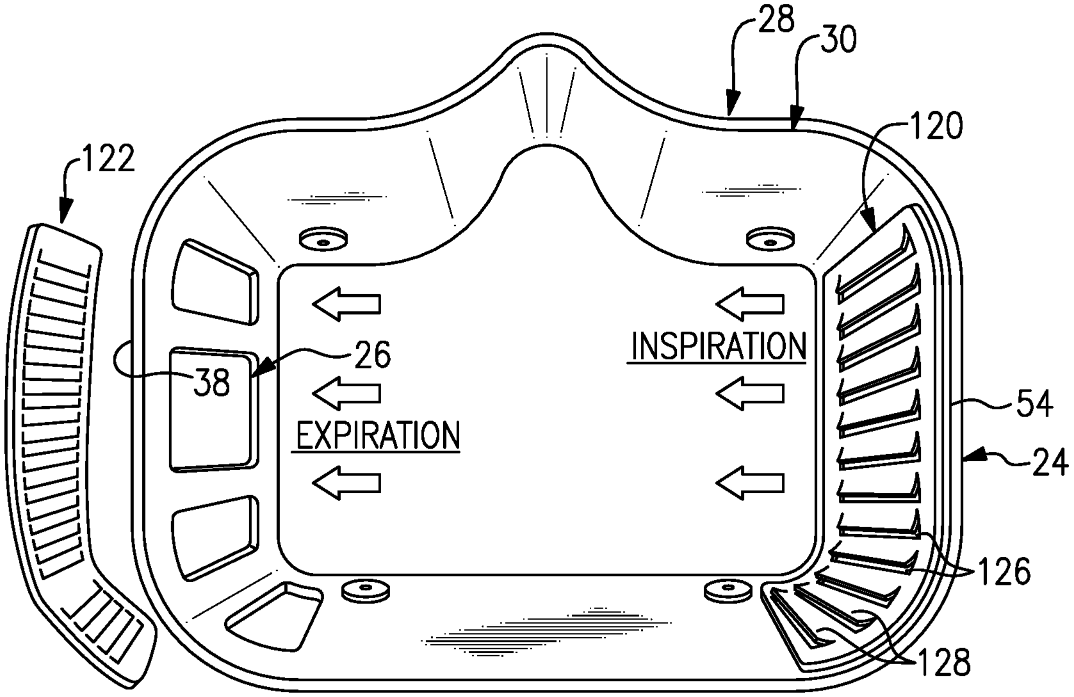
FIG. 16 is an end view of the inner and outer shells of the mask similar to FIG. 5, and illustrates an example valve arrangement.
Figure 17:
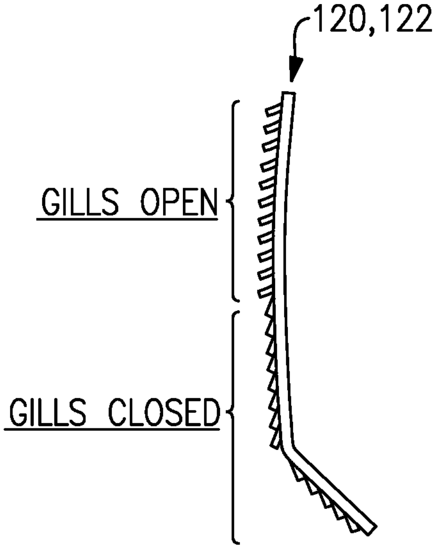
FIG. 17 is a side view of an example valve assembly.

FIGS. 16 and 17 illustrate a valve arrangement permitting only one-directional flow relative to the first and second sets of openings 24, 26. In this example, a first valve assembly 120 is attached to an inner surface of the first side wall 54 of the inner shell 30. The first valve assembly 120 is arranged relative to the first sets of openings 24 to permit inflow (i.e., inspiration) of air through the first sets of openings 24 and restrict outflow of air (i.e., expiration) from the first sets of openings 24. A second valve assembly 122 attached to an exterior of the second side wall 38 of the outer shell 28. The second valve assembly 122 is shown detached from the second side wall 38 for ease of reference in FIG. 16. The second valve assembly 122 is arranged relative to the second set of openings 26 to restrict inflow of air through the second sets of openings 26 and permit outflow of air from the second set of openings 26. The first and second valve assemblies 120, 122 each include a plurality of openings 126 and deflectable vanes 128 moveable to cover and uncover the openings 126 as the wearer 12 breathes. As shown in FIG. 17, the vanes 128 are deflectable between an open position and a closed position. In the closed position, the vanes 128 do not sit flush with the remainder of the valve assembly. Rather, the vanes 128 exhibit a slightly larger dimension than the openings 126 such that the vanes 128 sit against an adjacent surface of the valve assemblies 120, 122 when closed. In this way, it is relatively easy to open the vanes 128, and the vanes 128 do not become stuck within the openings 126. The valve assemblies 120, 122 may be attached to the mask 10 via adhesive, provided about a perimeter of the openings 126, or another attachment technique.

Figure 18:
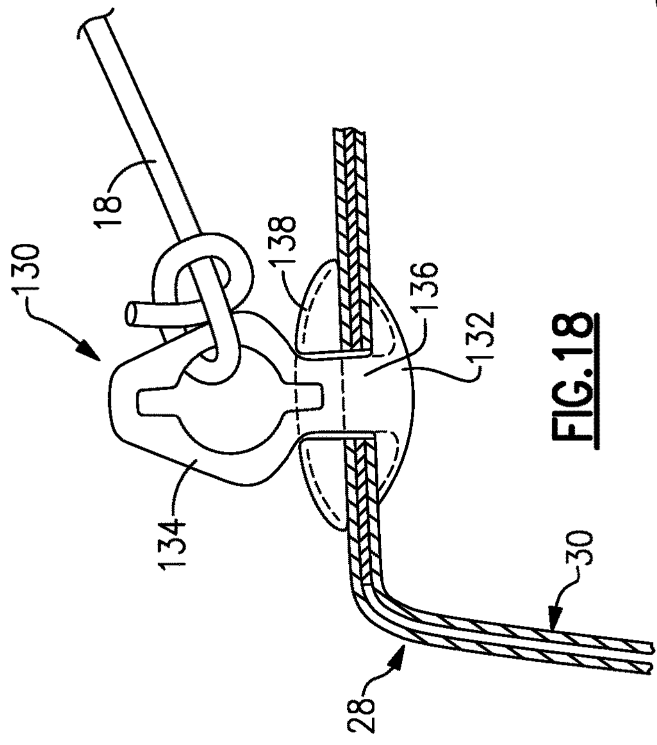
FIG. 18 is a sectional view illustrating another example strap attachment.
Figure 19:
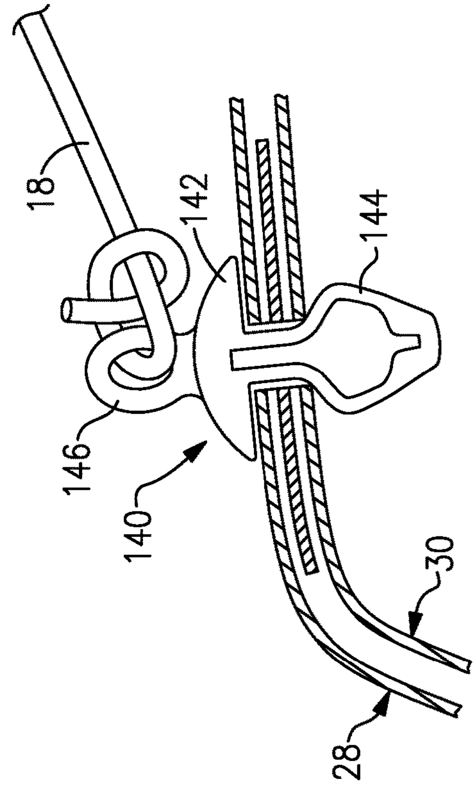
FIG. 19 is a sectional view illustrating still another example strap attachment.
Figure 20:
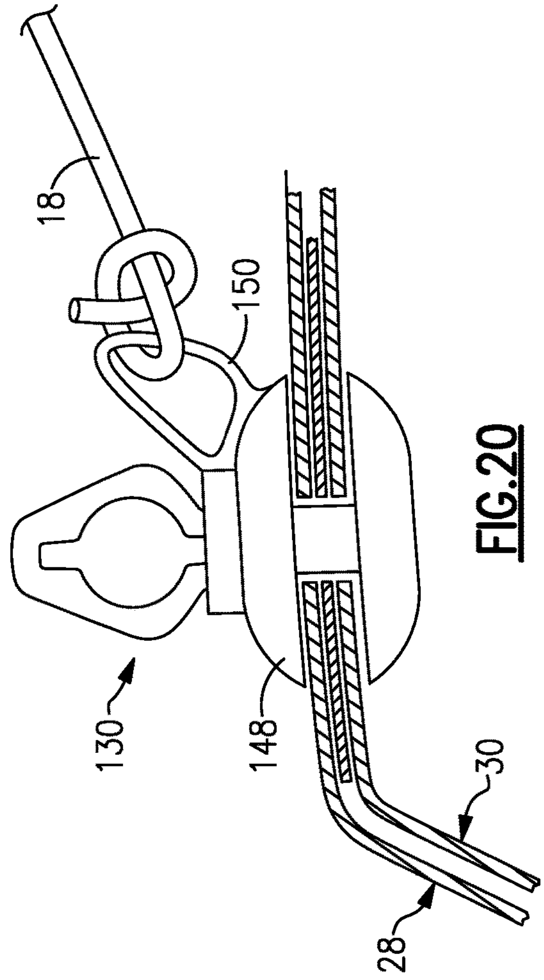
FIG. 20 is a sectional view illustrating yet another example strap attachment.

FIGS. 18-20 illustrate additional strap attachment configurations. In FIG. 18, a device 130 includes head 132 having a disc shape and is substantially configured as a button at one end and a deflectable loop 134 opposite the head 132. Between the head 132 and the deflectable loop 134 is a shaft 136, or stem, which projects through the openings in the inner and outer shells 28, 30 to reduce leakage. A washer 138 may be placed over the deflectable loop 134 to further reduce leakage and hold the device 130 in position. A knot of the strap 18 may be tied through the deflectable loop 134.

In FIG. 19, a device 140 includes a head 142 and a deflectable loop 144 opposite the head 142. A strap attachment loop 146 projects upwardly from the head 142. In FIG. 20, a washer 148 includes a strap attachment loop 150 is used relative to the device 130. Thus, in FIG. 20, one can remove the washer 148 without untying the strap 18.

Figure 21:
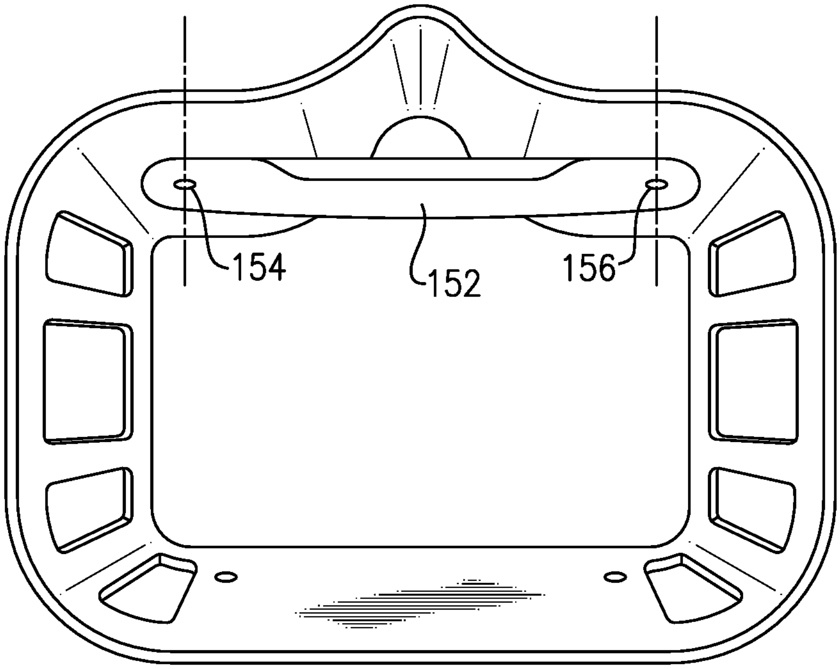
FIG. 21 is an end view of the inner and outer shells of the mask similar to FIG. 5, and illustrates another example deflector.
Figure 22:
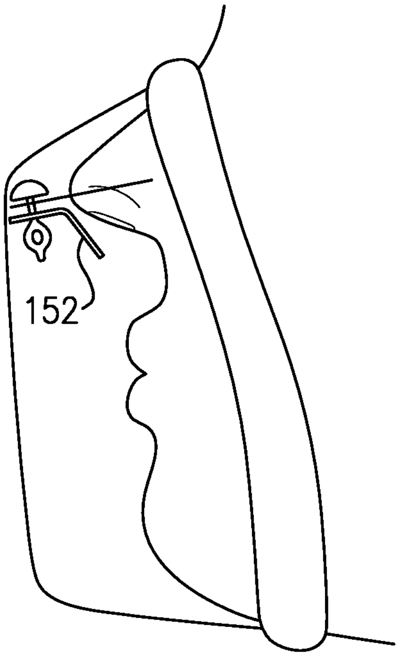
FIG. 22 is a side view of the mask and illustrates the deflector of FIG. 21.

FIGS. 21 and 22 illustrate another embodiment of a deflector 152 configured to deflect air exhaled from the nose of the wearer 12. The deflector 152 includes attachment holes 154, 156 that align with the top openings of the mask. The deflector 152, thus, is attachable using most of the aforementioned strap attachment configurations.

Figure 24:
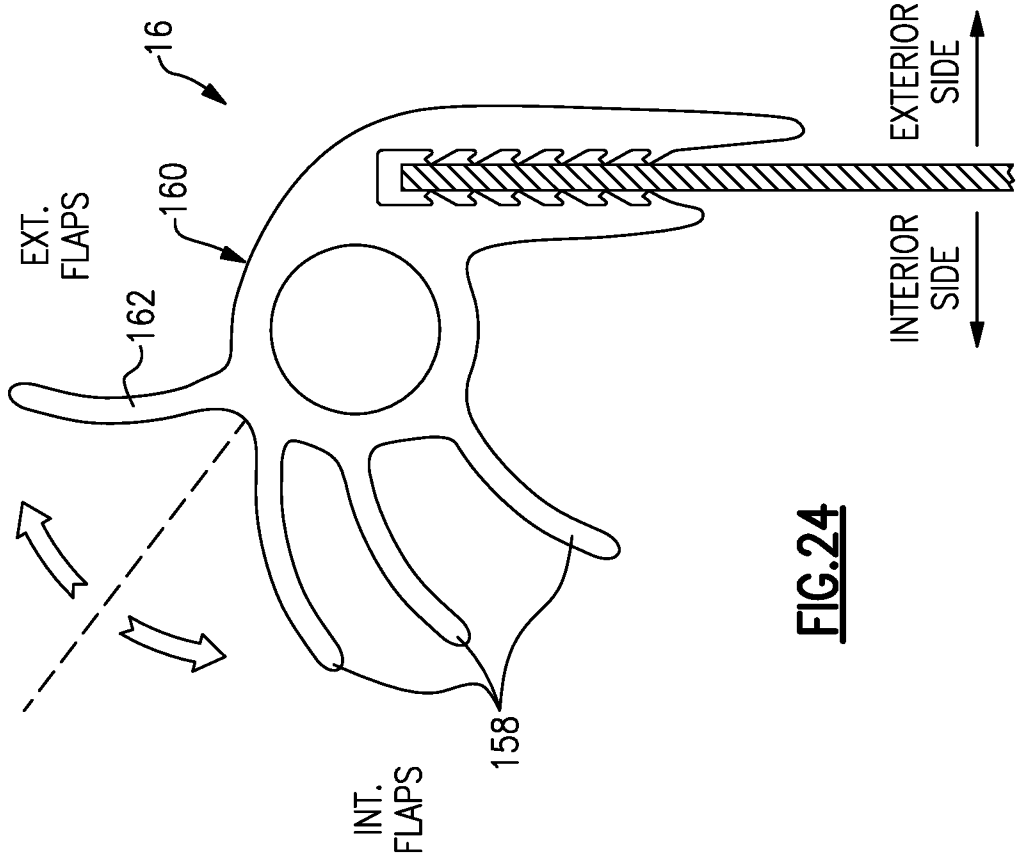
FIG. 24 is a sectional view of yet another seal.
Figure 23:
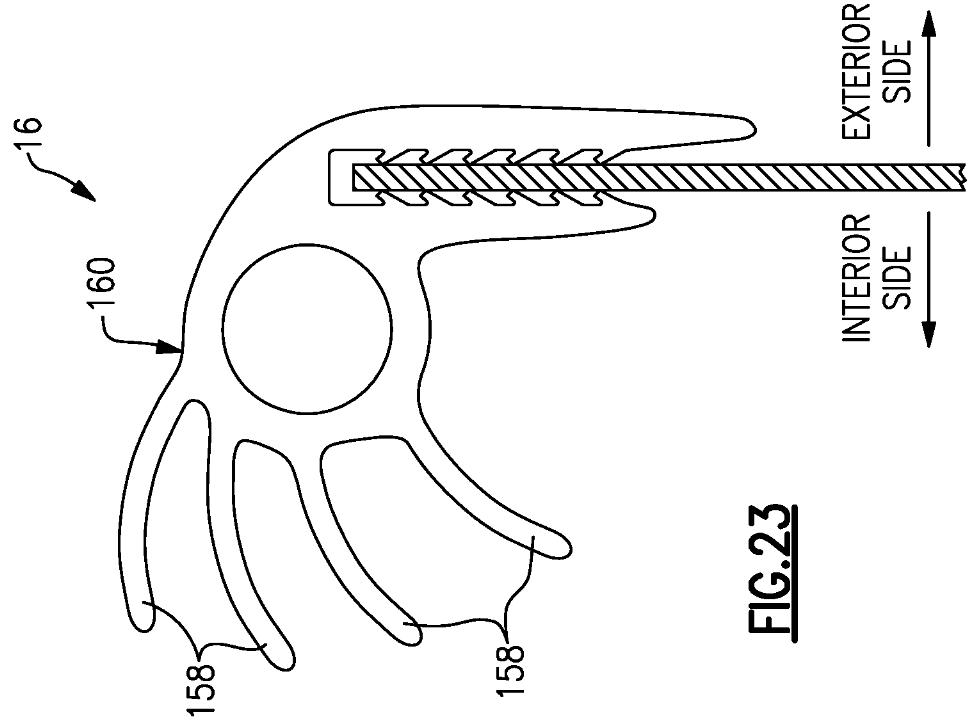
FIG. 23 is a sectional view of another seal.

FIGS. 23 and 24 illustrate additional embodiments of the seal 16. In FIG. 23, flaps 158 project directly from the hollow bulb 160 for increased conformity to a face of the wearer. In FIG. 23, all flaps 158 curve inwardly, toward a front viewport of the mask. In FIG. 24, an outermost flap 162 curves in an opposite direction to provide another option for conforming the mask to the face of a wearer, as the flaps 158 tend to press the seal 16 against the face of the wearer as pressure builds in the mask during a breathing cycle, and flap 162 tends to press the seal 16 against the face of the wearer as pressure decreases in the mask.

Figure 25:
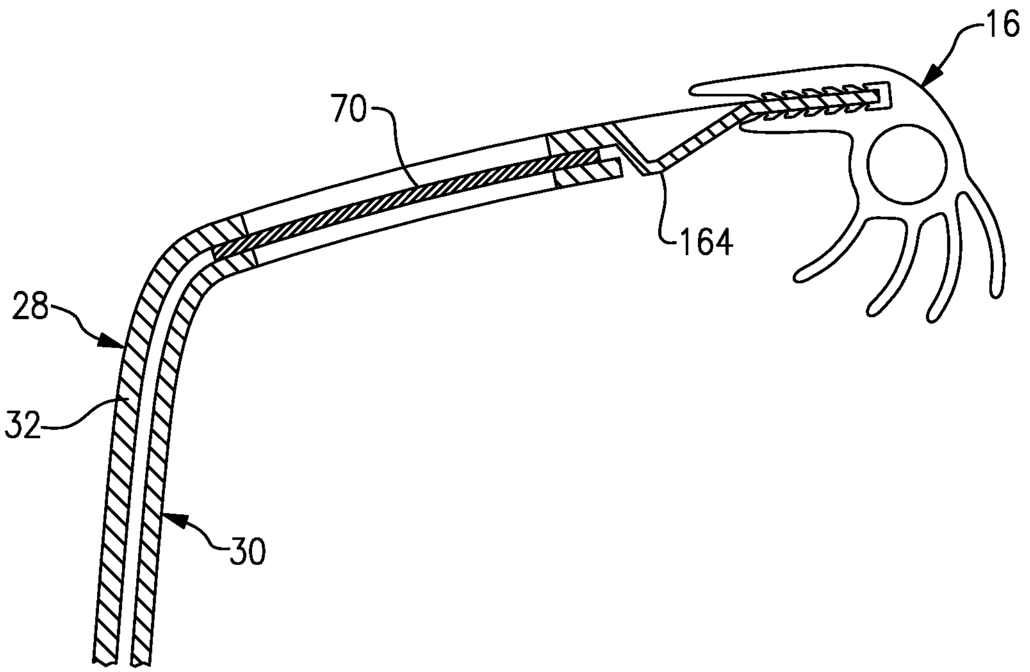
FIG. 25 is a sectional view of another example arrangement of the inner and outer shells, with the outer shell including a dimple holding the inner shell in place.

FIG. 25 illustrates an embodiment wherein the inner shell 30 is held within the outer shell 28 by one or more dimples 164 of the outer shell 28. The dimples 164 work in concert with the strap attachment configurations discussed above to hold the components of the mask 10 together. In this example, the perimeter wall of the inner shell 30 is of a lesser dimension than the perimeter wall of the outer shell 28 such that the inner shell 30 is held between the dimples 164 and the forward panel 32 of the outer shell 28. The inner shell 30 could be made from the same tooling as the outer shell 28 and trimmed to size.

Figure 26:
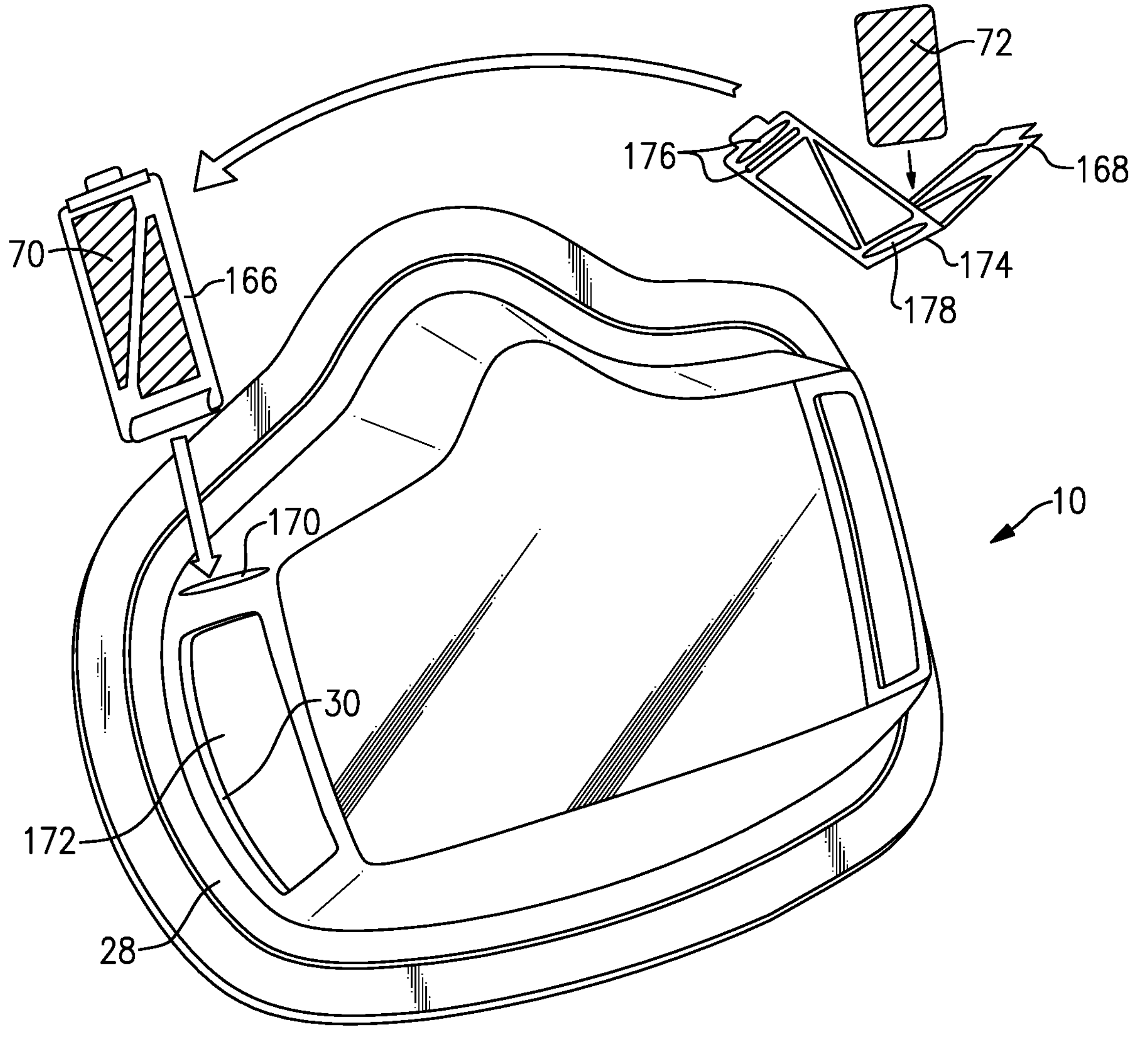
FIG. 26 is a perspective view of another example mask including frames holding the filters in place.

FIG. 26 illustrates another embodiment of the mask 10 in which filters 70, 72 are held in frames 166, 168 which are insertable into slots 170 (only one visible in FIG. 26) where they are held between the outer and inner shells 28, 30 such that the filters 70, 72 cover openings 172 in the side walls of the outer and inner shells 28, 30. In this example, each of the outer and inner shells 28, 30 includes a single, relatively large opening in each side wall. The frames 166, 168 are foldable at a hinge 174. The frames 166, 168 define openings permitting air to flow therethrough and include slots 176, 178 at opposite ends thereof for holding filters 70, 72 in place. In a particular example, the filters 70, 72 are essentially woven in and out of the slots 176, 178 such that the filters 70, 72 are held in place by friction. In this example, there are two upper slots 176 and one lower slot 178 to facilitate weaving of the filters 70, 72. In the example where the frames 166, 168 include two upper slots 176, weaving the filters 70, 72 between the upper slots 176 reduces if not eliminates any gaps where air could leak via the slots 170.

Figure 27:
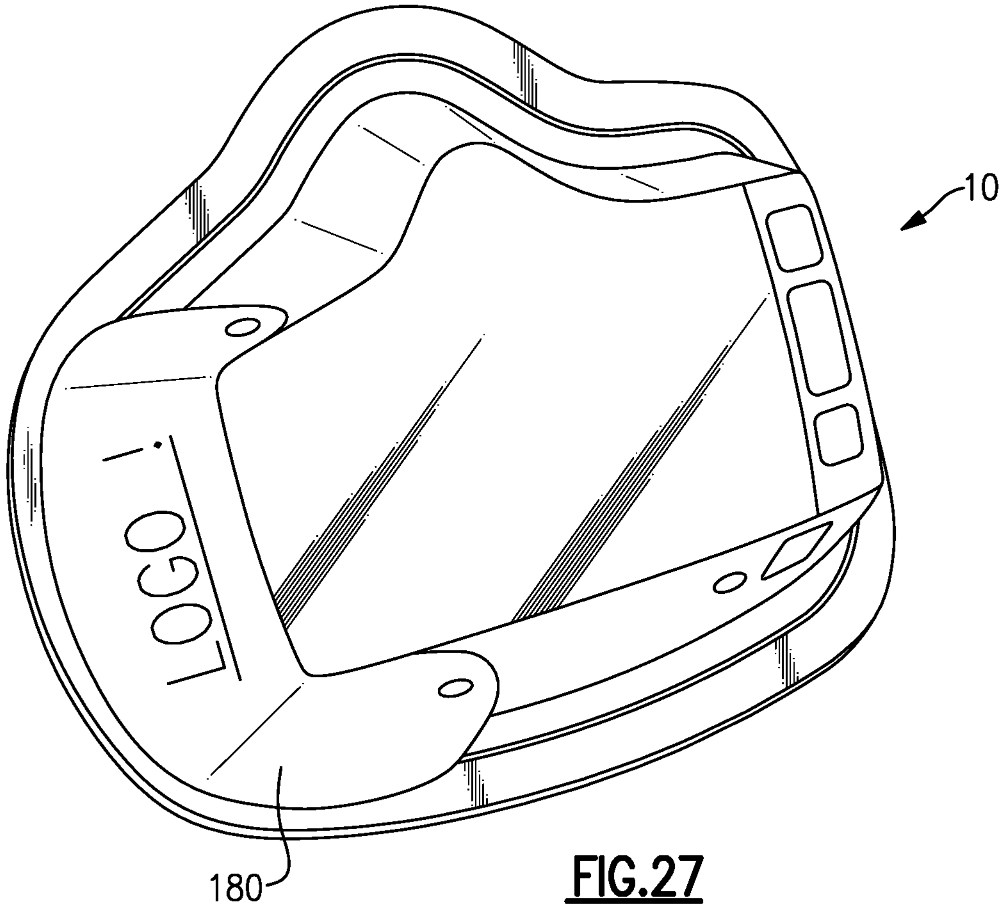
FIG. 27 is a perspective view of a mask with a filter shield.
Figure 28:
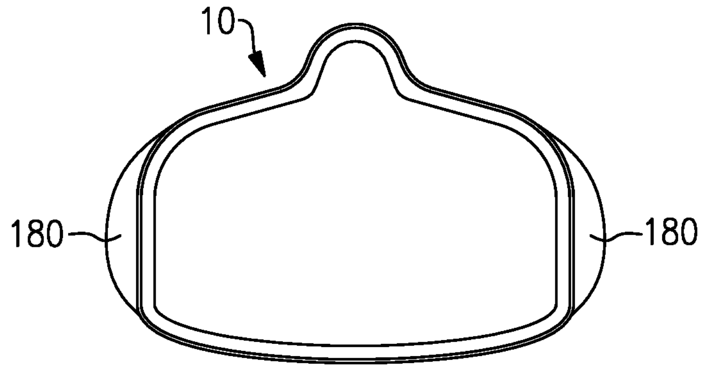
FIG. 28 is an end view of the mask of FIG. 27.

FIGS. 27 and 28 illustrate an optional shield 180 usable with any of the masks of this disclosure. The shield 180 is arranged to cover the filters from a front and side perspective but not a rear perspective. Thus, the shield 180 provides protection to the filters from splatter, for example, while not inhibiting use of the mask. The shield 180 may include a logo or other customization. The shield 180 is attachable using the strap attachment configurations.

Figure 30:
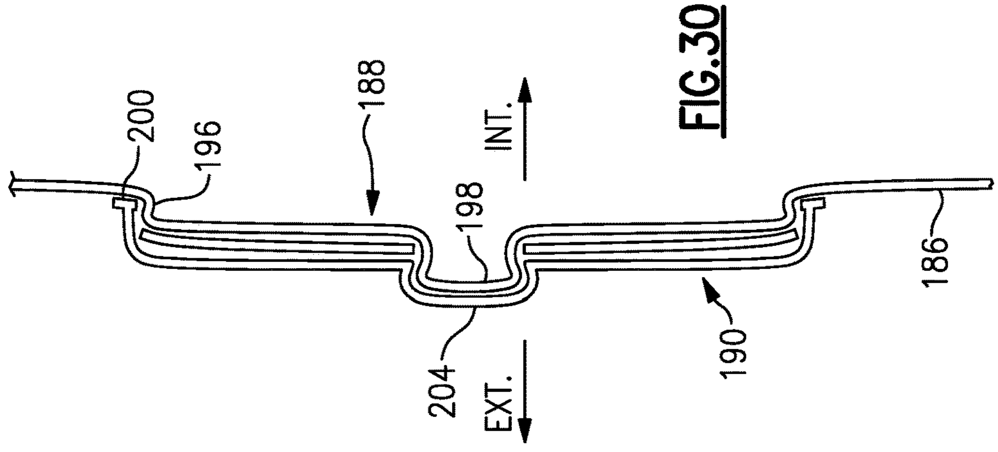
FIG. 30 is a sectional view of a portion of the mask of FIG. 29.
Figure 29:
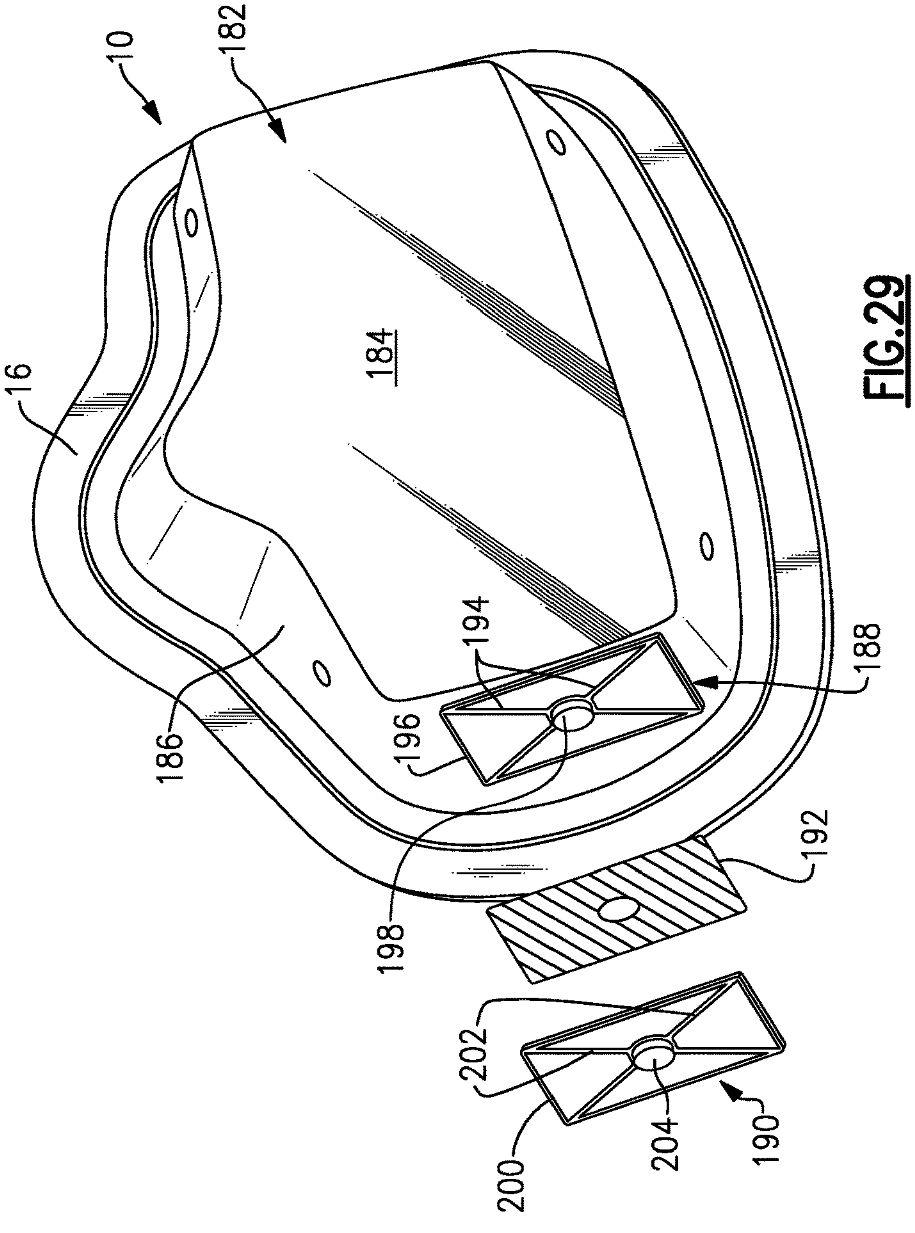
FIG. 29 is a perspective view of another example mask with another example filter frame configuration.

FIGS. 29 and 30 illustrate another exemplary configuration of the mask 10. In this embodiment, the mask 10 is provided by a single shell 182. The shell 182 is shaped substantially similar to the above described embodiments, including a front viewport 184 and a perimeter wall 186 extending to a seal 16. At the sides of the perimeter wall 186, the shell 182 includes two built-in bases 188, one base 188 on each side, projecting from the remainder of the perimeter wall 186 and configured to attach to clip-on frames 190. A filter 192 fits between the bases 188 and the frames 190. The bases 188, in this example, include four diagonally-extending supports 194 projecting from a perimeter 196 to a central button 198. The clip-on frames 190 likewise includes a similarly-configured perimeter 200, diagonally-extending supports 202, and a central button 204. While the supports 202 are diagonally-extending in this example, this disclosure extends to other support configurations. The clip-on frames 190 are configured to snap fit to the bases 188. For instance, the central button 204 is configured to snap onto the central button 198 and the perimeter 200 is configured to snap onto the perimeter 196 to hold the filters 192 in place.

Figure 31:
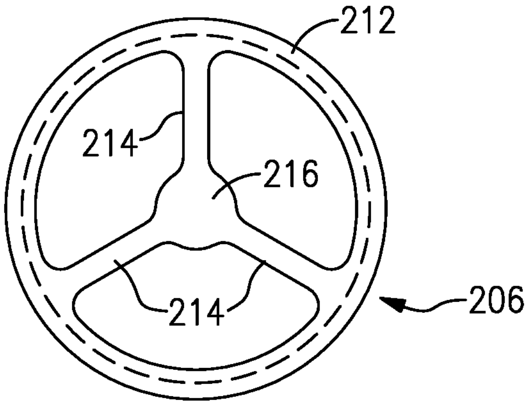
FIG. 31 is a top view of yet another example filter frame.
Figure 32:
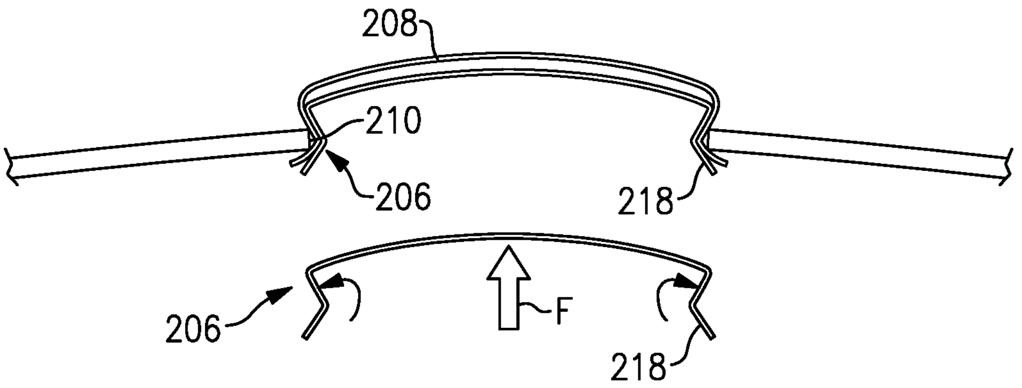
FIG. 32 is a sectional view of a portion of a mask, including a filter held in place by the filter frame.

FIGS. 31 and 32 illustrate another example filter frame 206 configured to hold a filter 208 relative to an opening 210 in the perimeter wall of the mask 10. The frame 206 is circular in this example, as are the filter 208 and opening 210. The filter frame 206 includes a perimeter 212, spoke-like supports 214, and a central portion 216. Further, an angled leg 218 projects from the perimeter 212. In order to hold the filter 208 in the opening 210, a force F is applied to the central portion 216, which makes the central portion 216 and supports 214 exhibit a substantially concave profile (when viewed from the top of FIG. 32) and changes the orientation of the angled leg 218 such that the angled leg 218 fits tightly relative to the opening 210, holding the filter 208 securely in place.

Figure 33:
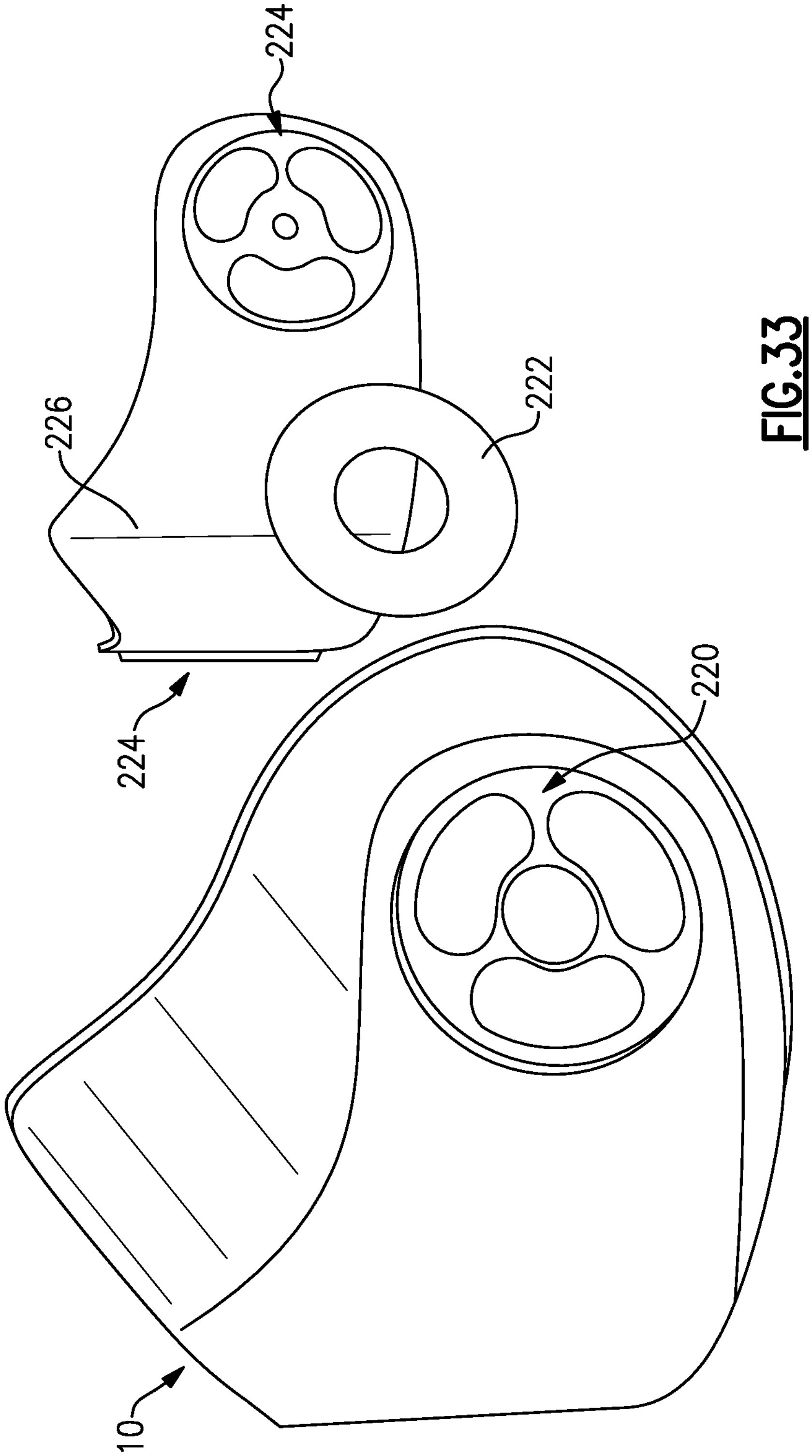
FIG. 33 is a perspective, exploded view of another example mask.

FIG. 33 illustrates another embodiment of the mask 10 including bases 220 formed in sides of a side wall of the mask 10. Filters 222 are held in place by frames 224 which snap-fit or otherwise couple to the bases 220, in the same manner as one of the above embodiments. The frames 222 and bases 224 are circular in this example and include kidney-shaped openings which are fully covered by the filters 222. In this example, two frames 224 are connected by a band 226. The frames 224 and band 226 are configured to fit inside the mask 10 to hold the filters 222 in place from the inside.

Figure 34:
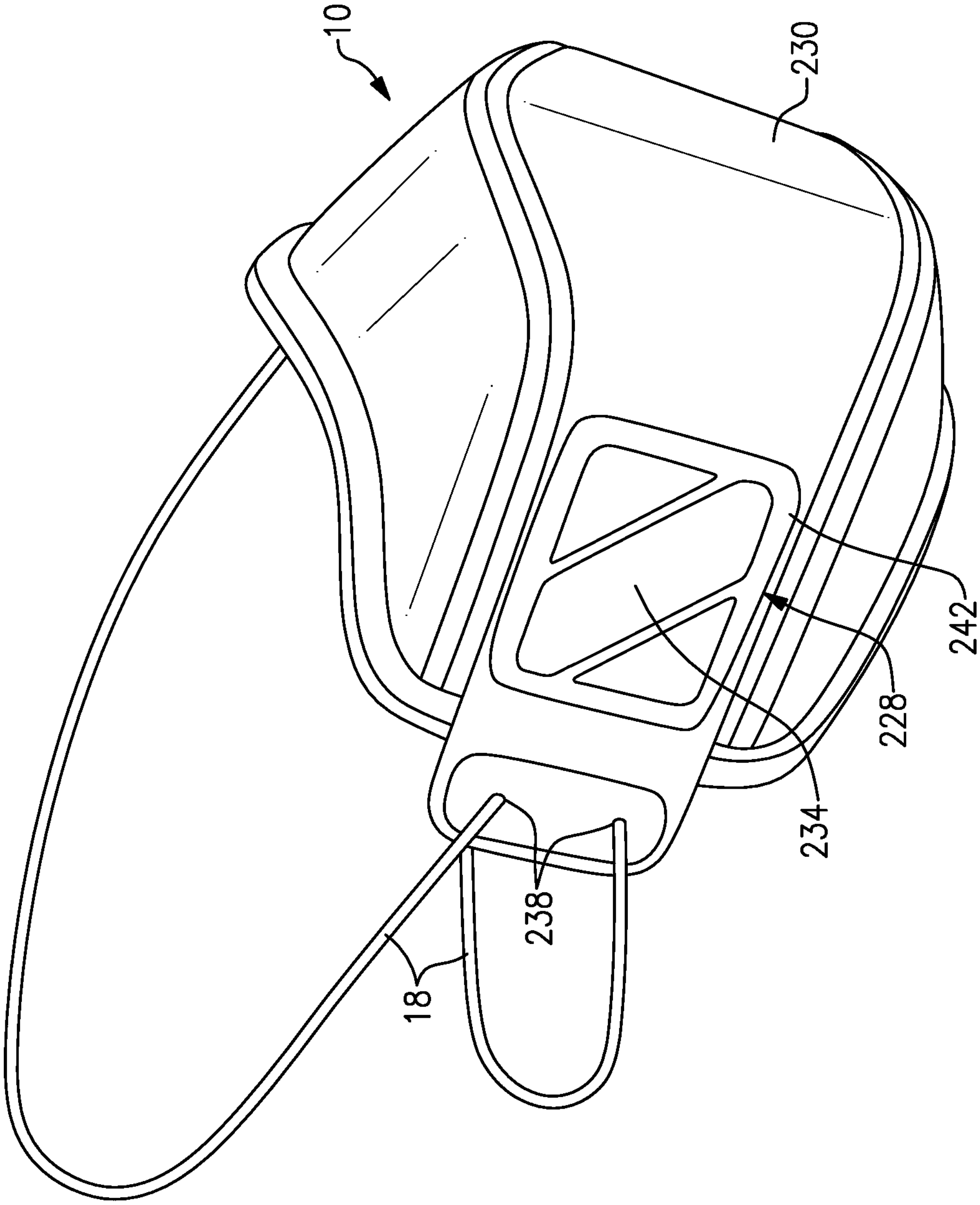
FIG. 34 is a perspective view of another example mask.
Figure 35:
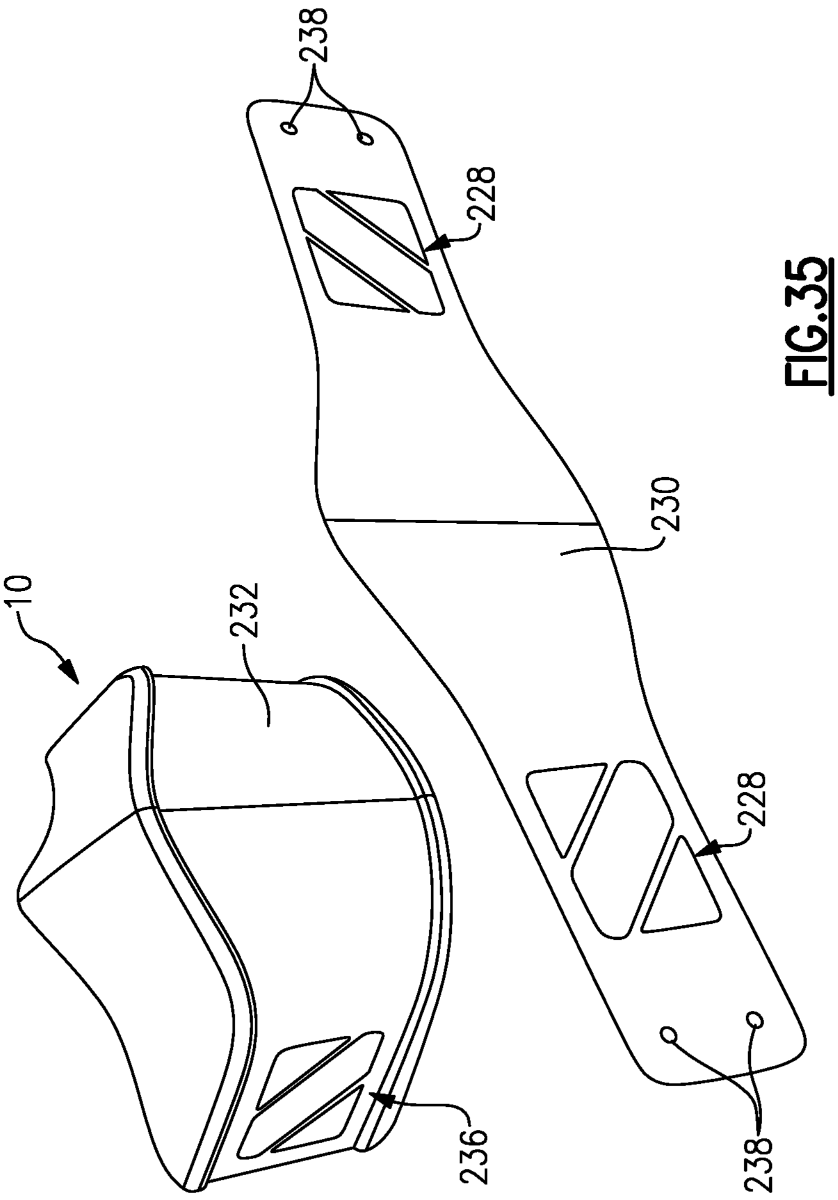
FIG. 35 is a perspective, exploded view of the mask of FIG. 34.
Figure 36:
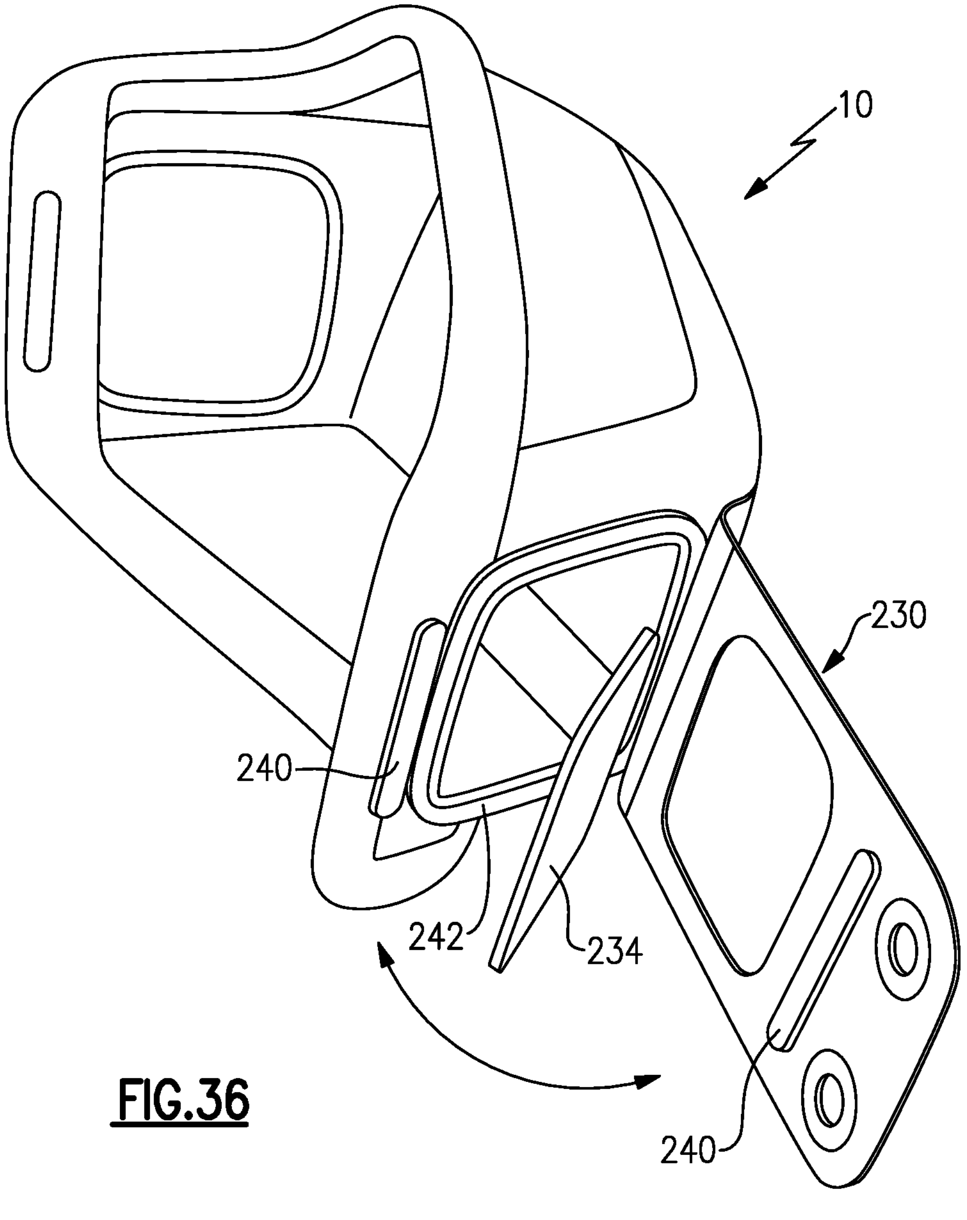
FIG. 36 is a rear perspective view of the mask of FIG. 34 with the band partially removed and with the filter removed for ease of reference.

In FIGS. 34 and 35, frames 228 are held together by a band 230 and fit within a channel 232 on an outside of the mask 10 to hold filters 234 relative to bases 236 of the mask 10. The band 230 includes openings 238 for attaching to a strap 18. Further, the band 230 could be held to the remainder of the mask 10 using magnets 240 or another attachment technique, as in FIG. 36. An elastomeric seal 242 could be attached to either the band 230 or adjacent the frames 228. The embodiments of FIGS. 26 and 29-36 facilitate changing of the filters as these embodiments do not require removal of the seal 16.

Directional terms such as "upward," "downward," "forward," "rearward," "top," "bottom," etc., are used herein for purposes of explanation and with reference to the orientation of components illustrated in the drawings. Such directional terms should not be considered limiting. Further, it should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A mask, comprising:
- an outer shell including at least one first opening and at least one second opening;
- an inner shell including at least one first opening and at least one second opening, wherein the inner shell is nested within the outer shell such that the at least one first opening and the at least one second opening of the inner shell substantially align with the corresponding one of the at least one first opening and the at least one second opening of the outer shell;
- a first filter fully overlapping the at least one first opening of the inner shell and the at least one first opening of the outer shell; and
- a second filter fully overlapping the at least one second opening of the inner shell and the at least one second opening of the outer shell;
- wherein the inner and outer shells each comprise a transparent forward panel.

2. The mask as recited in claim 1, wherein the inner and outer shells each comprise:
- a perimeter wall projecting from an edge of the forward panel to a free end.

3. The mask as recited in claim 2, wherein the perimeter walls of the inner and outer shells are tapered toward the forward panels.

4. The mask as recited in claim 2, wherein:
- the at least one first opening and the at least one second opening of the outer shell are formed in the perimeter wall of the outer shell, and
- the at least one first opening and the at least one second opening of the inner shell are formed in the perimeter wall of the inner shell.

5. The mask as recited in claim 2, further comprising:
- a seal covering the free ends of the perimeter walls of the inner and outer shells.

6. The mask as recited in claim 5, wherein the seal includes a slot receiving the free ends of the perimeter walls of the inner and outer shells.

7. The mask as recited in claim 6, wherein the slot of the seal includes a plurality of fingers inclined away from an opening of the slot.

8. The mask as recited in claim 5, wherein the seal includes a constant cross-section along an entirety of the seal.

9. The mask as recited in claim 2, further comprising a deflector adjacent to a top of the forward panel of the inner shell, wherein the deflector is configured to direct air exhaled out a nose of a wearer away from the forward panel of the inner shell.

10. The mask as recited in claim 2, further comprising:
- a plurality of strap attachments projecting outward from the perimeter wall of the outer shell and configured to attach to a strap, wherein at least some of the plurality of strap attachments are arranged closer to the forward panels than the free ends of the perimeter walls of the inner and outer shells.

11. The mask as recited in claim 10, wherein each of the perimeter walls includes:
- a first side wall;
- a second side wall opposite the first side wall;
- a top wall spanning between the first and second side walls; and
- a bottom wall opposite the top wall and spanning between the first and second side walls, and
- the plurality of strap attachments includes four strap attachments arranged adjacent to forward corners of the mask.

12. The mask as recited in claim 10, wherein the plurality of strap attachments include discs configured to interface with loops of the strap.

13. The mask as recited in claim 1, wherein the first and second filters are arranged so as to not obscure a view through the forward panels.

14. The mask as recited in claim 1, further comprising:
- a first valve assembly attached to an interior of the inner shell and arranged relative to the at least one first opening of the inner shell to permit inflow of air through the at least one first opening of the inner shell and restrict outflow of air from the at least one first opening of the inner shell; and
- a second valve assembly attached to an exterior of the outer shell and arranged relative to the at least one second opening of the outer shell to restrict inflow of air through the at least one second opening of the outer shell and permit outflow of air from the at least one second opening of the outer shell,
- wherein the first and second valve assemblies each include a plurality of openings and deflectable vanes moveable to cover and uncover the openings.

15. The mask as recited in claim 1, wherein a dimple of the outer shell holds the inner shell in place.

16. The mask as recited in claim 1, wherein the first and second filters are held in place by a frame.

17. The mask as recited in claim 1, wherein:
- the at least one first opening of the outer shell includes a plurality of first openings,
- the at least one second opening of the outer shell includes a plurality of second openings,
- the at least one first opening of the inner shell includes a plurality of first openings, and
- the at least one second opening of the inner shell includes a plurality of second openings.

18. A mask, comprising:
- an outer shell including a transparent forward panel and a perimeter wall projecting from an edge of the forward panel to a free end, wherein first and second openings are formed in the perimeter wall of the outer shell;
- an inner shell including a transparent forward panel and a perimeter wall projecting from an edge of the forward panel to a free end, wherein first and second openings are formed in the perimeter wall of the inner shell, and wherein the inner shell is nested within the outer shell such that the first and second openings of the inner shell substantially align with a respective one of the first and second openings of the outer shell;

a first filter fully overlapping the first openings of the inner and outer shells;

a second filter fully overlapping the second openings of the inner and outer shells; and a seal covering the free ends of the perimeter walls of the inner and outer shells, and wherein the seal includes a slot receiving the free ends of the perimeter walls of the inner and outer shells.

19. A mask, comprising:

an outer shell including a first set of openings, a second set of openings, a forward panel, and a perimeter wall projecting from an edge of the forward panel to a free end;

an inner shell including a first set of openings, a second set of openings, a forward panel, and a perimeter wall projecting from an edge of the forward panel to a free end, wherein the inner shell is nested within the outer shell such that the first and second sets of openings of the inner shell substantially align with the corresponding first and second sets of openings of the outer shell;

a first filter arranged between the inner shell and the outer shell such that the first filter fully overlaps the first sets of openings of the inner and outer shells;

a second filter arranged between the inner shell and the outer shell such that the second filter fully overlaps the second sets of openings of the inner and outer shells;

a seal covering the free ends of the perimeter walls of the inner and outer shells, wherein the seal includes a slot receiving the free ends of the perimeter walls of the inner and outer shells, wherein the slot includes a plurality of fingers inclined away from an opening of the slot, and wherein the seal includes a constant cross-section along an entirety of the seal;

a plurality of strap attachments projecting outward from the perimeter wall of the outer shell and configured to attach to a strap, wherein at least some of the plurality of strap attachments are arranged closer to the forward panels than the free ends;

wherein the perimeter walls of the inner and outer shells are tapered toward the forward panels, wherein the first and second sets of openings of the outer shell are formed in the perimeter wall of the outer shell, wherein the first and second sets of openings of the inner shell are formed in the perimeter wall of the inner shell, wherein the forward panels are transparent, and wherein the first and second filters are arranged so as to not obscure a view through the forward panels.

* * * * *